(12) United States Patent
Schust et al.

(10) Patent No.: US 6,357,229 B1
(45) Date of Patent: Mar. 19, 2002

(54) HYDRODYNAMIC CLUTCH AND METHOD OF OPERATING A HYDRODYNAMIC CLUTCH

(75) Inventors: Bernhard Schust, Kressberg; Haymo Bregler, Crailsheim, both of (DE)

(73) Assignee: Voith Turbo GmbH & Co., KG, Heidenheim (DE)

( * ) Notice: Subject to any disclaimer, the term of this patent is extended or adjusted under 35 U.S.C. 154(b) by 0 days.

(21) Appl. No.: 09/155,087

(22) PCT Filed: Jan. 21, 1998

(86) PCT No.: PCT/EP98/00313

§ 371 Date: Jun. 1, 1999

§ 102(e) Date: Jun. 1, 1999

(87) PCT Pub. No.: WO98/32987

PCT Pub. Date: Jul. 30, 1998

(30) Foreign Application Priority Data

Jan. 22, 1997 (DE) ..................................... 297 00 988 U
Feb. 20, 1997 (DE) ......................................... 197 06 652

(51) Int. Cl.[7] ............................................. F16D 33/10
(52) U.S. Cl. ........................................... 60/357; 60/359
(58) Field of Search ......................... 60/357, 358, 359, 60/360, 335, 348, 351

(56) References Cited

U.S. PATENT DOCUMENTS 3,405,524 A * 10/1968 Nelden ......................... 60/357
5,435,133 A * 7/1995 Schust et al. .................. 60/357

FOREIGN PATENT DOCUMENTS

| DE | 896195 | 5/1962 | ............. F06D/6/92 |
|---|---|---|---|
| DE | 35 31 987 A1 | 5/1987 | ........... F16D/35/00 |
| DE | 195 12 367 A1 | 10/1996 | ........... B65G/23/26 |

OTHER PUBLICATIONS

"Hydrodynamik in der Antriebstechnik" published by J.M. Voith GmbH, Vereinte Fachverlage Krauskopf–Ingenieur Digest, Mainz, 1987.
"Durchflussgesteuerte Turbokupplung Typ TPK and DTPK", Voith, Mar. 1995.

* cited by examiner

*Primary Examiner*—F. Daniel Lopez
*Assistant Examiner*—Michael Leslie
(74) *Attorney, Agent, or Firm*—Taylor & Aust, P.C.

(57) ABSTRACT

A hydrodynamic clutch includes at least two blade wheels that form at least one torus-shaped working chamber that can be filled with an operating medium. In a method of operating the hydrodynamic clutch, the filling degree is determined via a value that at least indirectly characterizes the filling degree. When a maximum filling degree is attained, the operating medium supply is interrupted. During the filling operation, the operating medium is led in a substantially proportional manner to the filling degree from the work chamber into an accumulation chamber coupled to the working chamber. At least one dynamic pressure generator or sensor is inserted into the accumulation chamber and is arranged relative to the accumulation chamber such that, in a first filling state in which the filling degree is lower than the maximum filling degree, no pressure or only a very small first pressure which is constant over the whole first filling state is generated in the dynamic pressure generating unit. In a second filling state which corresponds to the maximum filling degree, a second, substantially higher pressure is generated. This second pressure is at least indirectly used for driving a device that influences the operating medium supply to the working chamber.

53 Claims, 18 Drawing Sheets

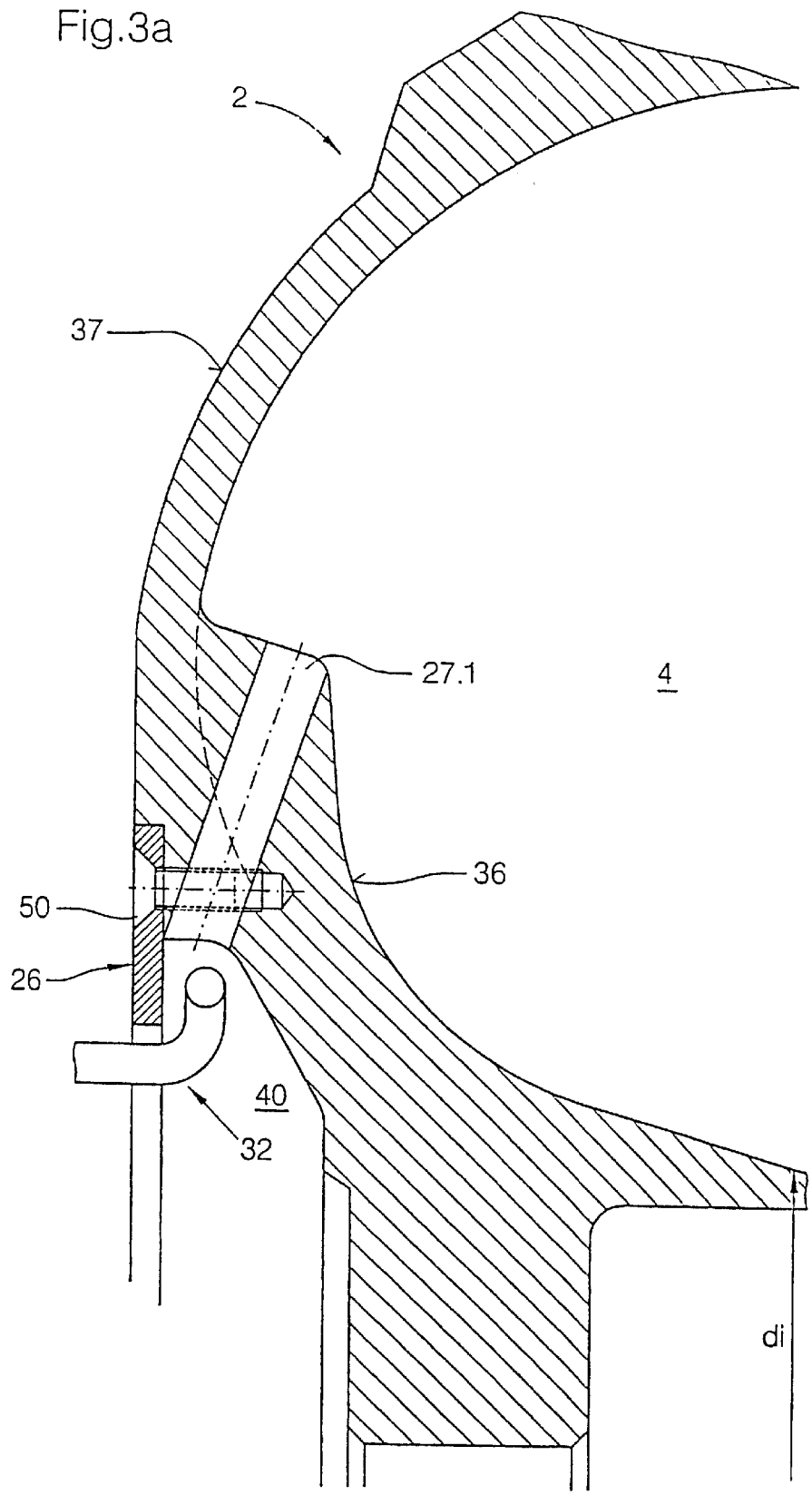

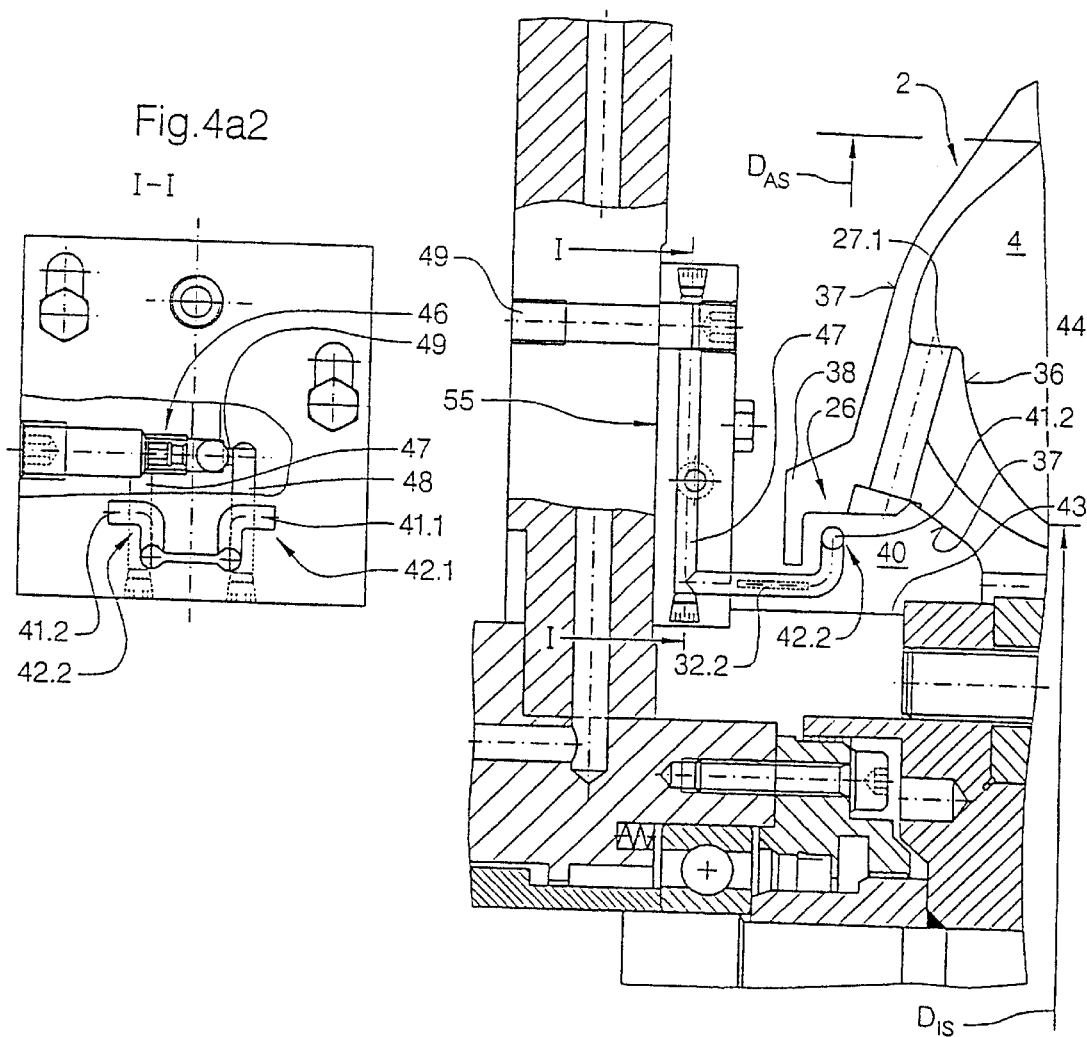

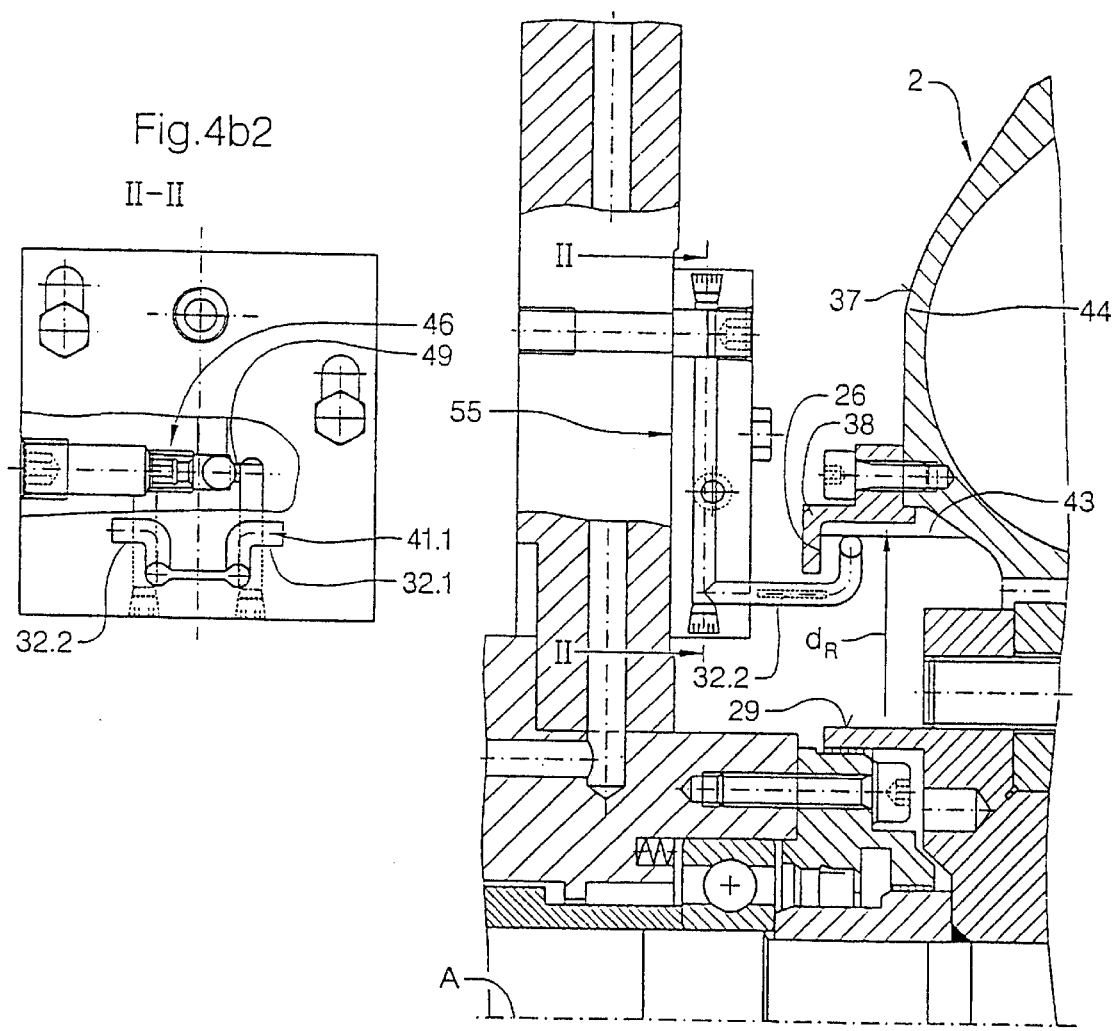

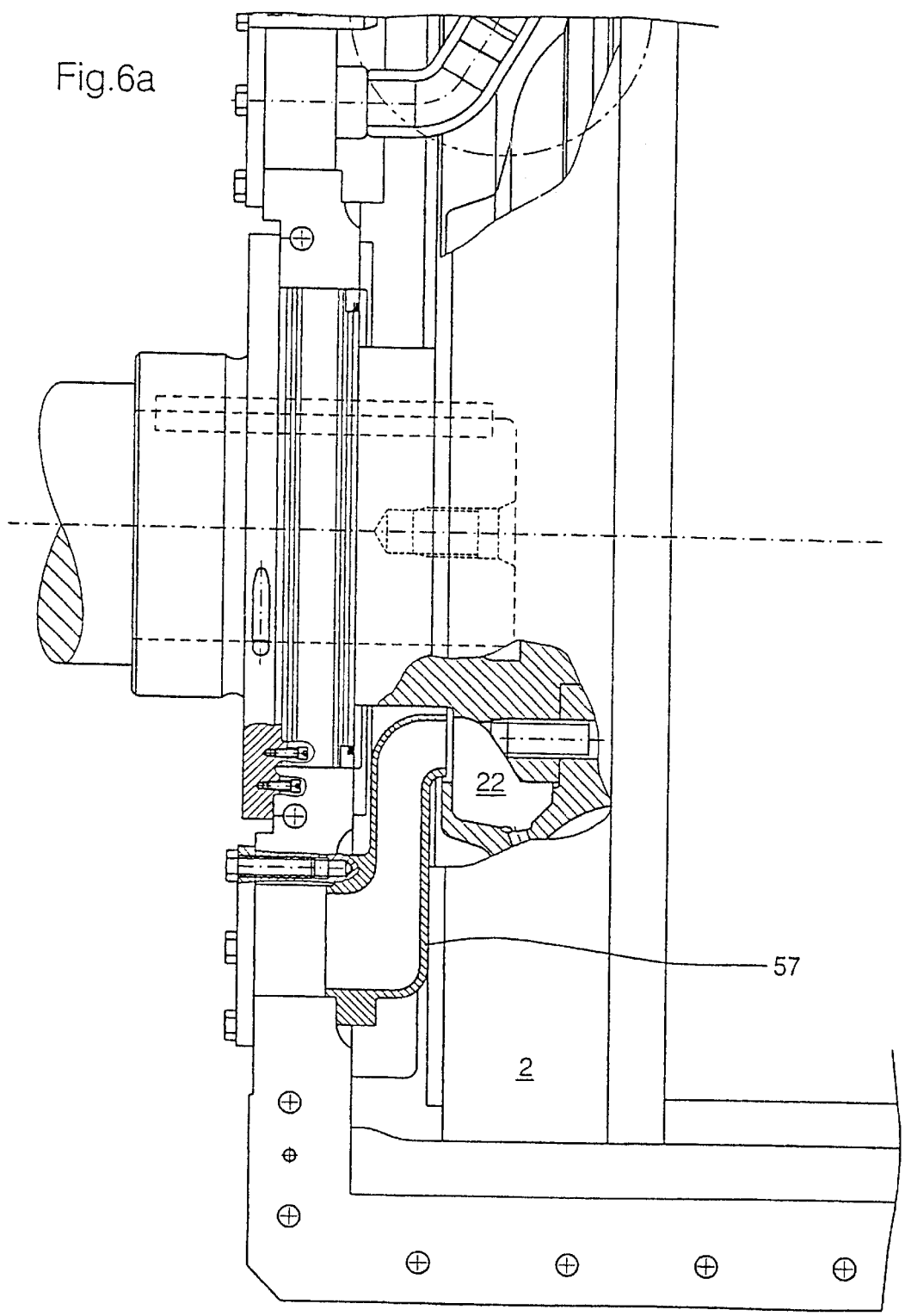

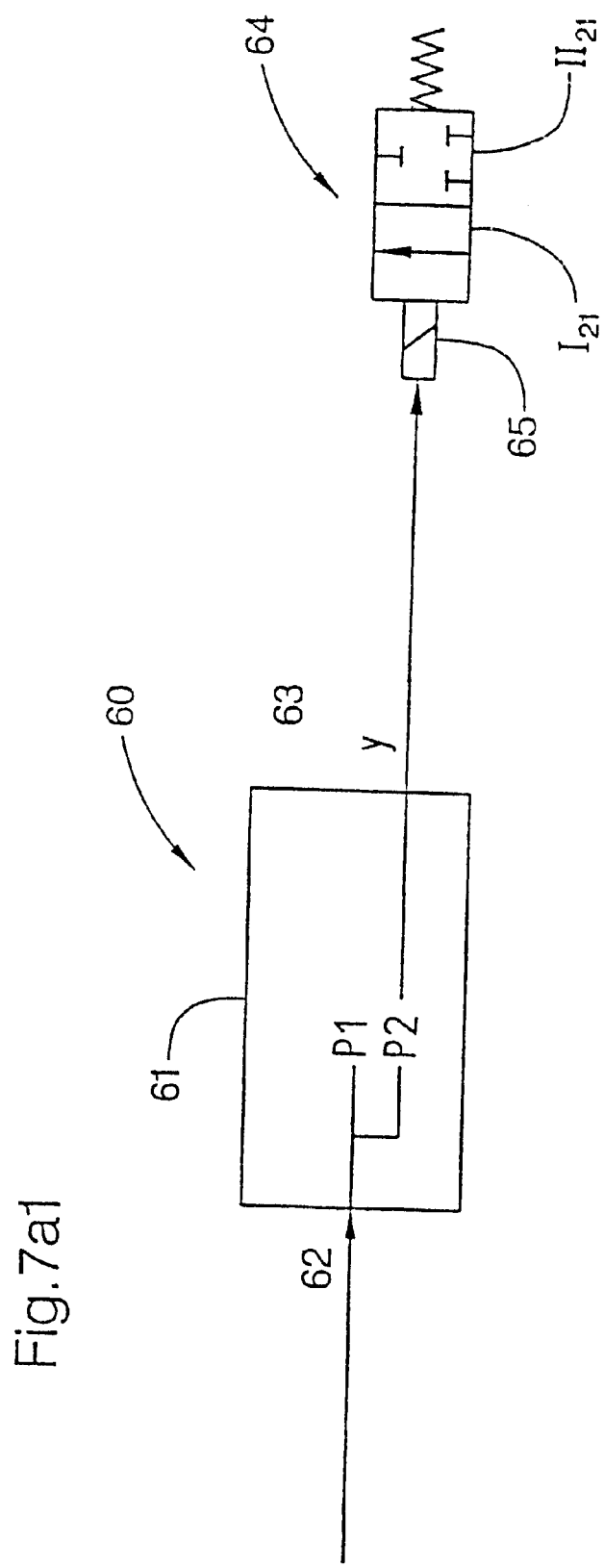

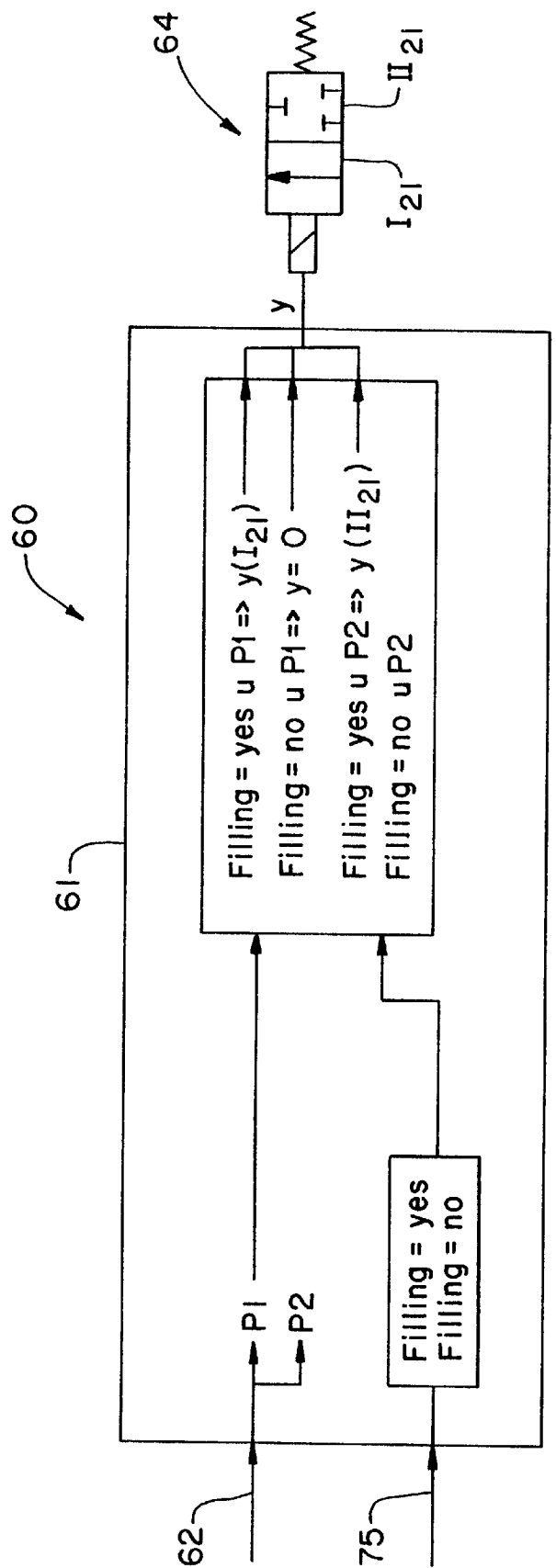
Fig. 7a2

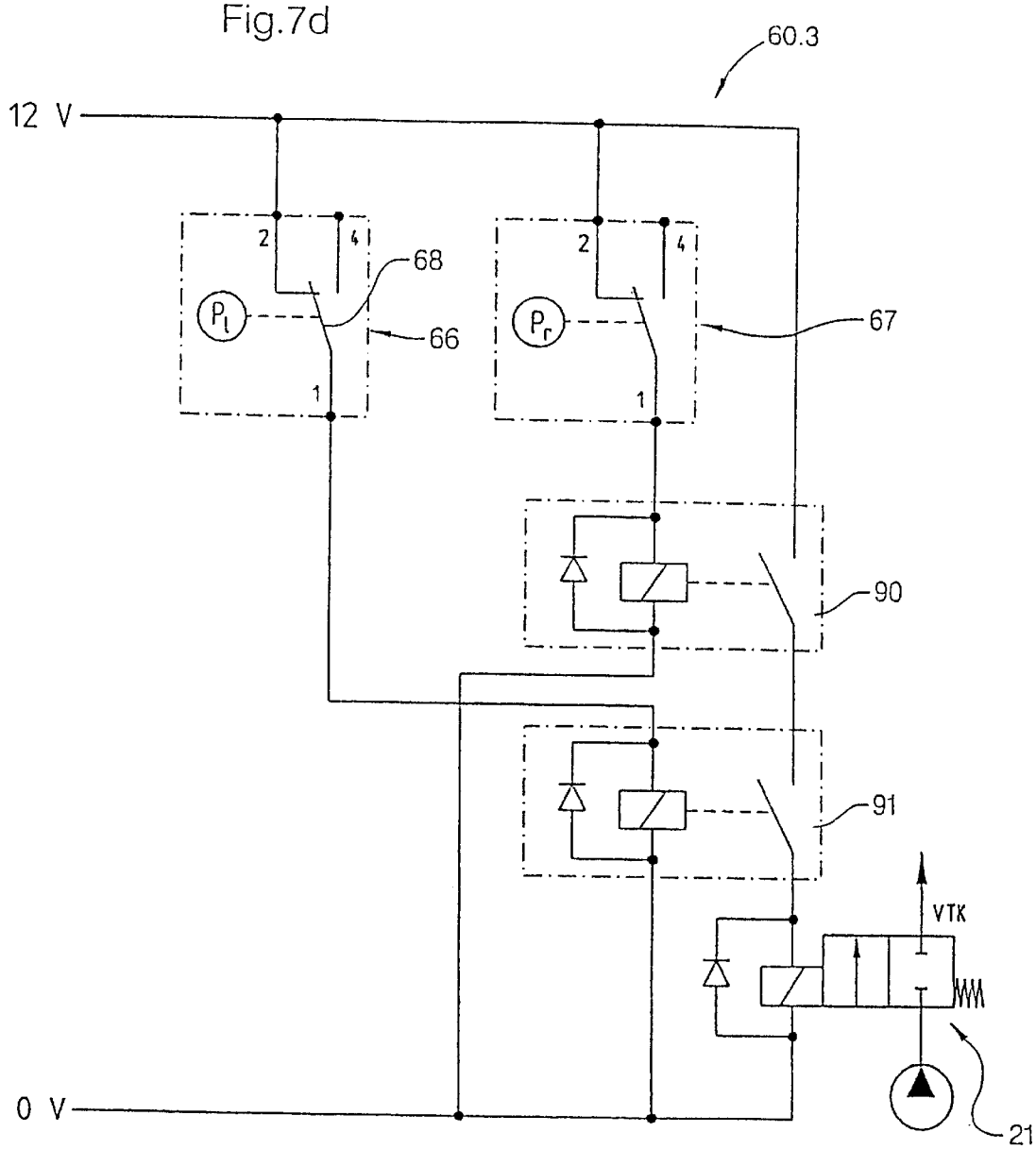

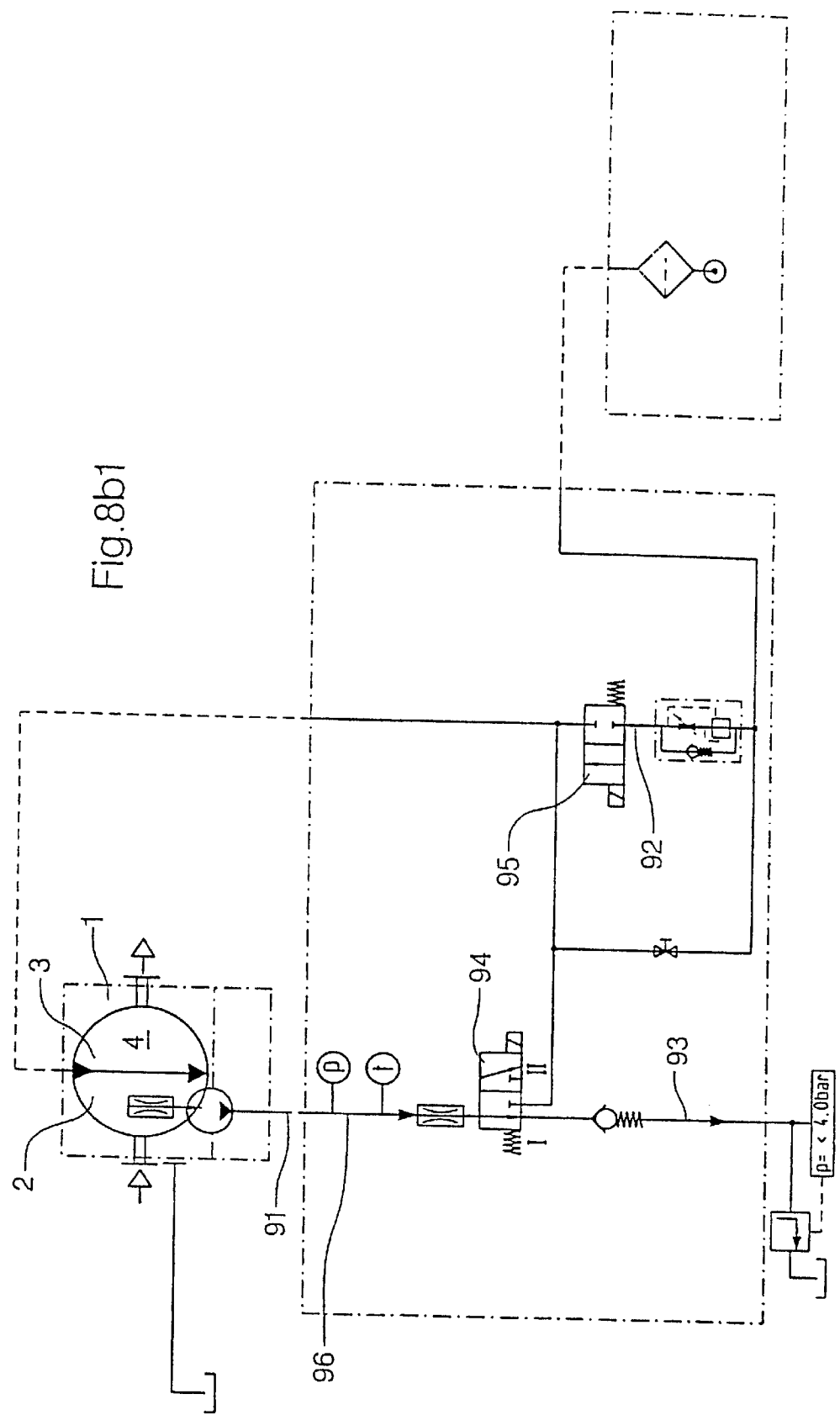

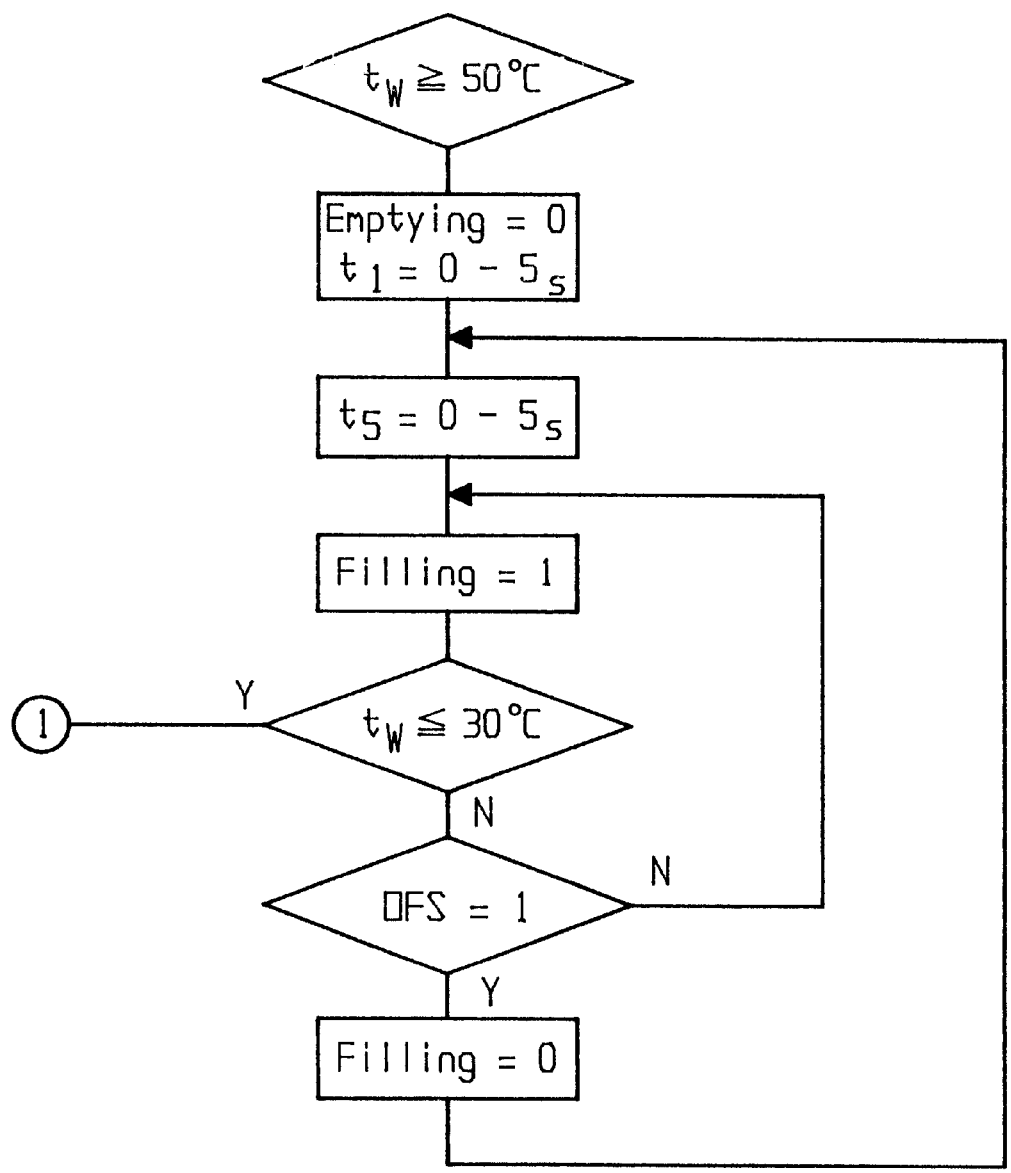
Fig. 8b2

HYDRODYNAMIC CLUTCH AND METHOD OF OPERATING A HYDRODYNAMIC CLUTCH

BACKGROUND OF THE INVENTION

1. Field of the invention

The present invention relates to a hydrodynamic clutch and a method of operating a hydrodynamic clutch.

2. Description of the related art

Hydrodynamic clutches for transfer of torque are known from many descriptions, for example from the pamphlets 1.) CR 252; and
2.) J. M. Voith GmbH" "Hydrodynamic in drive technology; Vereinigte Fachverlage Krauskopf Ingenieur Digest; Mainz 1987. Hydrodynamic clutches for transfer of torque include at least two blade wheels arranged concentrically to each other. The two blade wheels include one primary blade wheel and a secondary blade wheel which, together, form at least one torus-shaped work chamber. The primary blade wheel acts as a pump impeller and the secondary blade wheel as a turbine wheel. The primary blade wheel is linkable with a drive shaft that can be coupled at least indirectly with a drive motor for torsional strength. The secondary blade wheel is linkable with a drive shaft that can be coupled at least indirectly for torsional strength with a machine that is to be driven. For the transfer of torque, the working chambers are to be filled with operating medium. The operating medium is circulated due to the primary blade wheel rotation during the operation of the clutch, and produces a reaction moment on the blading of the secondary blade wheel. This circulation of the operating medium between the primary and secondary blade wheels is also referred to as operating circulation. However, not the entire flow of energy is converted into reaction moment, only a part, while the remainder is converted into heat.

Cooling of the operating medium during operation of the clutch can be accomplished in various ways. Possible is a cooling circuit which is allocated to the operating circuit, and through which, during operation, a part of the operating medium would be continuously supplied. Through appropriate openings in the blade wheels and through nozzles, the heated operating medium could, for example, be admitted to a pump shell that is rotating at the speed of the primary blade wheel. There, the operating medium is received by a dynamic pressure tube which is positioned against the direction of rotation. In its fitting position, the dynamic pressure tube engages in the pump shell above the clutch shaft. Because of the pressure conditions, the flow energy of the operating medium which is accepted through the accumulation dynamic pressure tube is sufficient to return it again to the clutch, without additional help, through a cooling unit, a cooler or a heat exchanger. For this purpose, an enclosed coolant circuit is assigned to the operating circuit during operation. There is always a sufficient quantity of operating medium in the clutch and in the cooling circuit when stationary. No liquid is added to or removed from this circuit. By adding to or removing operating medium from the clutch, an increase or decrease of the motor speed is achieved. For this purpose, a supply line or channel and a discharge line or channel are assigned to the operating chambers for the purpose of filling and emptying. The supply and discharge lines are connected to an external operating medium supply source, such as an operating medium tank. The provision of the supply and discharge lines to the operating chambers can be arranged separately from the cooling circuit or by utilizing the lines or channels of the cooling circuits.

Other methods of exchanging or cooling the operating medium present in the operating chamber are possible. For example, the operating medium can be exchanged in the operating circuit by simultaneous removal of a certain volume of heated operating medium and by feeding of operating medium at lower temperature in the corresponding volume.

A significant problem with hydrodynamic clutches is that, depending on the application, and due to the rotation of the rotor parts of the clutch in a housing, the danger exists during start-up or activation of not filling the clutch to an exact level. Rather, the clutch can be overfilled, since an exact filling degree is very difficult to achieve. A deterioration of the efficiency level and an increasing leakage in the individual labyrinths, that is, the operating medium carrying lines, are apparent due to additional losses in the rotor parts themselves, such as the individual blade wheels, the housing and the rotor parts. A solution for the avoidance of these disadvantages, which would include an additional discharge line from the housing to the tank, is not desirable. In order to avoid overfilling, the supply line or the control unit for regulating the supply is triggered through a filling signal. The pressure in the discharge line, for example, may act as the filling signal. This pressure is measured by an acquisition sensor measuring the current pressure value in the discharge line from the operating chamber. The unit is locked electrically through a pressure switch when the unit exceeds a certain pressure so that supply of additional operating medium is prevented. However, the problem with such a method is that this signal is very inexact due to the varying marginal values. Also, this signal is often insufficient in order to prevent overfilling of the clutch. The pressure switch itself must always be adjusted very precisely during initial operation and, moreover, is subjected to the pressure peaks by the opened filling valve in the supply line. Specifically, a certain pressure value is continuously determined, with the device for measuring the pressure, during a time span between an empty condition of the clutch to a maximum filling of the clutch.

This pressure value steadily increases. A clear deviation in increase in a characteristic curve for the pressure, in dependence on the clutch filling, occurs only in the area of overfilling, that is at a clutch filling degree of greater than 100%. Each pressure value is therefore proportional to a certain filling degree. In order to determine a full status, a corresponding pressure value must therefore be measured. Tolerances may be included in these determinations. Consequently, only a small pressure area remains in which an overfill may be concluded. Within this limited pressure area, triggering of the pressure switch is necessary. Since the determined pressure value in the line can still be affected by a series of additional marginal factors, the acquired pressure value often does not correspond with the theoretically assigned filling degree. An early termination of filling at a filling degree of less than 100%, or overfilling, is then the result.

SUMMARY OF THE INVENTION

The present invention expands on a method of operating a hydrodynamic clutch so that the disadvantages of the current state of the art are avoided. Specifically, an effective protection against overfilling is realized which is suitable for different applications and offers quick response times. The method of the present invention distinguishes itself through low constructional and control engineering costs. The constructional design necessary in order to realize overfill protection is greatly non-susceptible to failure and is able to very quickly and precisely sense and respond to a maximum permissible filling degree. The maximum permissible filling degree can be consistent with the generally maximum permissible and freely definable filling degree.

According to the invention, a hydrodynamic clutch, including at least two blade wheels, one primary blade wheel and a secondary blade wheel, which together form at least one torus-shaped operating chamber, is operated so that only two filling degree conditions are recognized. One filling degree condition includes the condition of non-filling and partial filling, and a second filling degree condition describes the maximum permissible filling degree. An established first, very low first pressure value is assigned to the first filling degree condition. A greater pressure value is assigned to the second filling degree condition. The operating chamber is coupled with an accumulation chamber. The operating medium is fed from the operating chamber into the accumulation chamber at a certain ratio to the fill degree of the clutch. The operating medium level in the accumulation chamber is measured by a dynamic pressure sensor. This sensor is at least indirectly coupled with a device to influence the supply volume into the operating chamber, generally with a control device of a valve arrangement. The dynamic pressure sensor works, so to speak, according to the black-white principle. In the first filling degree condition, no pressure is sensed, or only a very small, substantially constant pressure is sensed. A substantially greater pressure is sensed in a second filling degree condition as compared to the first filling degree condition. The device for at least indirectly influencing the supply volume, generally an actuator of a valve arrangement in a supply line, is triggered only after the increased pressure occurs, thereby reducing or discontinuing the operating medium supply. In the method according to the invention, therefore, a corresponding pressure signal is allocated only to the operational conditions of no or partial filling, and full level filling. The pressure signal is generated through the dynamic pressure generator or sensor unit from the dynamic pressure occurring in the accumulation chamber. It is important that a refined, easily recognizable signal spike is generated during the transition from one state to another. This ensures that, regardless of additional disturbances during operating medium supply, overfilling is very easily recognized. This system is particularly not susceptible to pressure peaks through the filling valve that serve to influence the supply volume. A precise adjustment of the pressure switch during initial operation is unnecessary. Optimization of the system is unnecessary. The method distinguishes itself through an easily realizable and precise determination of exceeding a maximum filling degree by the use of a so-called black-white recognition.

As a rule, the maximum permissible filling degree is consistent with the actual maximum permissible filling degree. Generally, this is at 100%. It is, however, also possible to define the maximum permissible filling degree such that it corresponds to a predetermined filling degree that must be maintained for a particular application purpose. This filling degree, which must be maintained, may be described by any partial filling, specific to the maximum permissible filling degree.

In this device, the actual operating chamber is equipped with a catch trough which forms an accumulation chamber which is at least indirectly coupled with the operating chamber for the purpose of operating medium supply. The catch trough is arranged on a diameter which, during the operation of the hydrodynamic clutch, permits at least one filling of the accumulation chamber which is in proportion to the fill condition of "full" in the hydrodynamic clutch. A dynamic pressure sensor is inserted into the accumulation chamber which is in communication with the operating chamber and which is formed by the catch trough. Preferably, the dynamic pressure sensor is in the form of a dynamic pressure tube for the purpose of sensing the fill level in the pressure chamber. The dynamic pressure generator, dynamic pressure tube, or sensor is located relative to the pressure chamber so that its opening is above or outside the operating medium fill level in the accumulation chamber when working with a non-filled or only partially filled clutch. Thus, its opening is not filled during this filling degree condition. Under these conditions, no operating medium is discharged through the dynamic pressure tube, and therefore no pressure signal is produced. However, as soon as the filling degree of the clutch reaches the maximum permissible filling degree, that is, generally full level, the accumulation chamber fills so that the dynamic pressure sensor, particularly the dynamic pressure tube with its opening, projects into the operating medium, picks up operating medium and thereby produces a signal for a dynamic pressure of $P_{dynamic}=(\rho/2)xv^2$.

The dynamic pressure tube is located in the pressure chamber so that it acquires a high dynamic pressure only at an operating medium level in the accumulation chamber that is consistent with the maximum filling degree of the clutch. During the previous filling degree conditions which are consistent with empty or partial fill, the opening of the dynamic pressure tube is in an area of the accumulation chamber that is free of operating medium. Under these conditions, no pressure, or only a very low pressure, is measured through the dynamic pressure generator or sensor. A corresponding signal is produced. This low pressure is consistent, for example, with the pressure that would exist in an empty, open tube located in the atmosphere. Since in the area between the empty condition of the hydrodynamic clutch and the maximum filling degree no pressure signal and only a very low pressure is produced, and a dynamic pressure consistent with $P_{dynamic}=(\rho/2)xv^2$ in the accumulation chamber is measured only when the maximum filling degree is reached, the condition of maximum filling degree in the hydrodynamic clutch can be recognized easily, immediately, and without error influences. This is because a differentiation is made only between the two filling degree conditions which differ by a strong pressure change in the form of a pressure increase. The resulting pressure signal may then be used to directly trigger a control device, specifically an actuation of a valve arrangement of a device to at least indirectly influence the through-flow volume in the supply to the operating chamber of the hydrodynamic clutch.

The maximum filling degree may correspond to an actual, maximum permissible filling degree of generally 100%. It is, however, also possible to define the maximum permissible filling degree such that it corresponds to a predetermined filling degree that must be maintained for a particular application purpose. The maximum filling degree which is consistent with the projected filling degree that is to be maintained can then be defined lower through each filling degree than the actual maximum permissible filling degree.

The definition of the filling degree to be maintained may be accomplished by adjusting the position of the dynamic pressure generator or sensor, specifically the opening for intake of operating medium in the accumulation chamber. It can be moved vertically, that is, in mounting position, radially. It can also be moved circumferentially in the accumulation chamber, or by pivoting. The entire circumferential area may be considered an adjustment area. The change in position for individual applications may be permanently set, or may be adjusted during operation. This offers the advantage that due to an overfill protection, various applications of a hydrodynamic clutch of a certain type and size are covered by active adaptability to changing requirements.

An advantageous design dispenses with a separate catch trough and utilizes the operating medium catch trough. This offers the advantage that already existing components are used. The location of the dynamic pressure tube in the operating medium trough, or protrusion of the end of the pressure tube into the operating medium trough, whereby the dynamic pressure tube is located in a separate fill segment which is located upstream from the operating medium catch trough, depends on the fact that draining from the operating medium trough occurs only as long as the maximum fill, that is, the full condition, has not yet been reached.

A multitude of possibilities present themselves for the arrangement of the accumulation chamber, which is substantially determined by the catch trough, and the assignment of the catch trough to the operating circuit. The catch trough may be designed as a separate component which is detachably linked with the corresponding rotor parts for assignment to the operating chamber. Preferably, however, the catch trough is manufactured with a blade wheel as a single component.

The dynamic pressure generator or sensor, which is preferably designed as a dynamic pressure tube, exhibits a part including an opening. This part is preferably located substantially parallel to the operating medium level establishing itself in the accumulating chamber. An inclined or vertical arrangement is also possible. The opening area extends at least partially vertical to the radial direction and in circumferential direction, whereby the direction of rotation must be considered. Preferably, the opening area points completely in circumferential direction and is arranged substantially vertical to it.

The method according to the invention may be utilized with all types of hydrodynamic clutches with variable filling. The clutches may take the form of single circuit clutches that are equipped with a primary and a secondary blade wheel and which together form a torus-shaped operating chamber. Alternatively, they may take the form of multiple circuit clutches on which several primary and secondary blade wheels form a multitude of operating chambers. In the first referred to arrangement, the catch trough may be assigned to the primary as well as the secondary blade wheel, or to a shell. In the last mentioned arrangement, an assignment to only one of the blade wheels, generally the outer blade wheel, is possible due to design factors.

The coupling between the accumulation chamber and the operating chamber may take various design forms. The connection between the interior of the catch trough and the operating chamber can preferably be accomplished through at least one clearance opening in the blade wheel. The clearance opening permits a transfer of operating medium from the operating chamber into the accumulation chamber. The clearance opening may vary in its configuration. Clearance openings in the form of clearance bores or elongated holes which are arranged on a determined diameter of the blade wheel are possible. Preferably, a multitude of openings are arranged on a diameter in circumferential direction. An arrangement of different diameters and/or a combination of the individual types of clearance openings is also possible.

The clearance openings may be located between the individual blades in the blade base or in an area, located radially inside the blade wheel, which is free of the blading. Depending on the design of the clearance opening, the fill may also be dependent on the speed differential, that is, the slippage between the primary and the secondary wheel. Thus, a short bridging of the pressure signal may be necessary.

Preferably, the part of the dynamic pressure tube that is equipped with the opening is arranged substantially parallel to the operating medium in the accumulation chamber. The opening itself may be placed vertically or inclined relative to the operating medium level. Independence from the direction of rotation is achieved by the provision of at least two pressure tubes which, with regard to the orientation of the part of the dynamic pressure tube that is equipped with the opening, are arranged in opposite direction. The two pressure tubes can be coupled with each other by use of a return valve. Another design form provides two dynamic pressure tubes which are coupled with each other with a separate respective pressure switch. The dynamic pressure tubes submerge in the accumulation chamber which is established by the catch trough and the outer dimensions of the blade wheel to which the catch trough is assigned. Thus, at a maximum filling degree, a dynamic pressure is measured by submerging the dynamic pressure tube in the operating medium in the catch trough. This maximum filling degree does not necessarily have to be consistent with the total fill condition. Any optional filling degree which can be defined as the maximum filling degree is also possible. This maximum filling degree may be defined according to the individual application of the hydrodynamic clutch. The dynamic pressure tube may be designed adjustably for this purpose, so that the height of immersion into the operating medium in the catch trough may be varied. This offers the advantage of being able to easily adapt overfill protection to different requirements. A design of the component that is equipped with the opening in radial direction is also possible.

The catch trough may, as already mentioned, be designed as a separate trough on the clutch rotor. However, there is also the option of utilizing the operating medium infeed trough, that is, the trough that is coupled with the supply line, for the purpose of supply to the operating chamber. In the last mentioned arrangement, no additional design measures are necessary on the blade wheels of the hydrodynamic clutch, but there is instead the possibility of utilizing existing devices.

The pressure signal produced by the dynamic pressure tube, which is used to trigger a control element in a device intended to influence the filling degree, especially a device for controlling the supply volume into the operating chamber, may be processed by an overriding control unit. Another method would be to direct triggering of the control element via the device for measuring a value which at least indirectly characterizes the filling degree of the clutch. To that effect, a control device becomes effective in that filling is either interrupted or reduced. Since the pressure signal is generally not effective directly on the control device, a converter to convert the pressure signal into an electric control signal is necessary between the device for measuring the filling degree. Preferably, a pressure switch is provided for this.

The method according to the invention for realizing overfill protection by recognizing the filling degree conditions can be used on all types of hydrodynamic clutches. Preferably, it is utilized on hydrodynamic clutches whose operating chambers can be emptied during operation of the clutch.

In order to achieve the function of filling degree recognition and utilization of the appropriately produced signals, especially pressure signals for triggering the device which is intended to influence the operating medium supply to the operating chamber of the hydrodynamic clutch, a control unit is preferably provided. This includes at least one control device which always has at least a first input and a first output. The first input of the control device may be at least indirectly coupled with the dynamic pressure generator or sensor. The first output of the control device may be at least indirectly coupled with the device that is intended to influence the operating medium supply to the operating chamber of the hydrodynamic clutch.

At this first input therefore, the dynamic pressure produced by the dynamic pressure generator or sensor is supplied as a signal to the control unit, either directly or as a proportional value which differs with regard to the dimension from the dynamic pressure value. In the control unit, for example, a controller output Y is allocated to either the established dynamic pressure value or to a proportional value which becomes at least indirectly effective on the device that is intended to influence the operating medium supply to the operating chamber. In the most simple scenario that is consistent with the second increased pressure value, a controller output is allocated to only the input signal at the control unit. The control unit in this instance will act as a simple converter. That is, it will or will not allocate a controller output to an input signal. The controller output Y, which is provided at the output of the control unit, can then either become directly or indirectly effective on an actuator of the device that is intended to influence the operating medium supply volume to the operating chamber of the hydrodynamic clutch. Controller output Y may be an electric, hydraulic or pneumatic, as well as a mechanical value.

These functions that are performed by the control unit can be achieved either by an appropriate selection of components and their coupling, or through a suitable microprocessor control unit. In order to perform the basic function, that is, recognition of the filling degree and triggering of the device that is intended to influence the operating medium supply volume to the operating chamber of the hydrodynamic clutch, at least two pressure switch units can be provided.

One pressure switch device each is allocated to a rotational direction of the clutch and thereby to an opening area on the dynamic pressure generator or sensor. The pressure switches assume the task of electrically triggering the actuator of the device that is intended to influence the operating medium supply volume to the operating chamber of the hydrodynamic clutch. Each pressure switch unit includes a switch which effects the corresponding coupling. In the first operating position of the pressure switch, generally when a fill signal is present, the actuator for the device that is intended to influence the operating medium supply volume to the operating chamber is triggered so that operating medium may enter the operating chamber. The release of the supply line to the operating chamber may also be continuously adjustable. Based on the pressure signal from the dynamic pressure generator or sensor, the switch is moved into the second operating position. In this second operating position, the device that is intended to influence the operating medium supply volume to the operating chamber of the hydrodynamic clutch is moved into an operating position in which the operating medium supply to the operating chamber is reduced or interrupted.

This indirect coupling arrangement between the individual pressure switch units and the actuator for the device that is intended to influence the operating medium supply volume to the operating chamber of the hydrodynamic clutch represents the minimum required equipment necessary to realize the control functions of the overfill protection. In addition, an interlock can be provided in the control circuit which can short circuit the line which connects the device that is intended to influence the supply volume into the operating chamber, possibly turning it off. That is, the actuator is no longer energized.

The switches of the pressure switch unit are triggered directly through the dynamic pressure that is produced by the dynamic pressure generator or sensor. This means that either the dynamic pressure directly, or a proportional value, becomes active at the switch and operates it. However, the first option is preferable.

A further preferred arrangement of the control unit includes at least one delay unit in the form of a time-delay relay which is installed downstream from the individual pressure switch units. This means that the device that is intended to influence the operating medium supply volume to the operating chamber of the hydrodynamic clutch, i.e., the fill valve, is switched with a certain time delay when an appropriate signal that corresponds to the maximum filling degree occurs. This is in order to prevent overfilling during a short-term pressure drop at the pressure switch. The time period is selected to be as short as possible. Preferably, time periods of between 0 and 5 seconds are utilized. This time period is adjustable according to individual situations, or can be established as a default value in the design of the time delay units. Additionally, the contact functions of pressure switches may also be used for additional switching and safety functions.

A design variation with a time-delay unit, however, should preferably not be used with clutches having a regulated coolant circuit, since the automatic control could be negatively affected.

It is also possible to install the pressure switch units directly in line with the filling valve. However, with this arrangement, the device that is intended to influence the operating medium volume to the operating chamber of the hydrodynamic clutch is activated even during short pressure drops at the pressure switch unit, thereby refilling operating medium in the operating chamber.

When starting up a motor, the hydrodynamic clutch may only be filled until there is signal present at one of the two pressure switch units. If, however, the operating chamber is not totally filled in spite of this, it would mean that the signal from the dynamic pressure generator or sensor subsides after a certain time period, and automatic refilling occurs.

In order to realize a defined fill of the clutch, i.e., a re-established filling degree, the device that is intended to influence the supply volume to the operating chamber, namely the fill valve, remains opened until the pressure switch unit reacts. Then, operation at normal rating is anticipated, and possibly a refill is made when the dynamic pressure generator or sensor signal drops to the first pressure value. In addition, the drain valve, that is, the device that is intended to influence the drainage volume from the operating chamber, is opened in a timed manner until the pressure switch unit no longer triggers the device that is intended to influence the supply volume. The filling valve is then again operated sequentially until the fill level recognition triggers again, that is, the dynamic pressure generator or sensor produces the second pressure value. By continuously monitoring the filling degree, and by continuous reaction to the filling degree, it is ensured that the desired defined filling degree is regulated. The defined filling degree that is to be determined, however, depends on the position of the dynamic pressure generator or sensor, particularly on the opening area in the accumulation chamber. The position of the dynamic pressure generator or sensor in the accumulation chamber, or their opening area relative to the accumulation chamber, always determines a firmly defined, maximum permissible filling degree. In general, this corresponds to the maximum permissible fill level of 100%. It can, however, also describe an established partial filling degree. An adjustability of the maximum permissible filling degree is also possible, by arranging the dynamic pressure generator or sensor adjustable in the accumulating chamber.

On some clutch arrangements, a coolant circuit is utilized with the operating chamber during continuous operation for the purpose of cooling. In other words, a part of the operating medium is released from the operating chamber during operation and is again returned to it through a circuit arrangement whereby a supply and drainage line can always be connected to this circuit, i.e., by use of appropriate valve arrangements, for the purpose of volumetric cooling. In such clutch arrangements, the drainage valve in the discharge from the operating chamber of the hydrodynamic clutch is first opened following triggering of the temperature monitoring unit for the operating medium exchange and the fill valve is closed after a preset time period, which can also be zero. In this scenario, operating medium is taken from the operating circuit, and at the same time, or after a very short time delay, new and cooled operating medium is added. If the signal for the filling degree condition recognition reacts during this operating medium exchange, in other words, if a second increased pressure value is produced at the dynamic pressure generator or sensor, then the device that is intended to influence the supply volume into the operating chamber, i.e., the fill valve, closes for the still set time in order to avoid overfilling. If the temperature has dropped off below an acceptable limit, the clutch is filled again. That is, the device that is intended to influence the operating medium supply volume to the operating chamber is switched so that the operating medium supply is coupled with the operating chamber. The fill valve is again closed after occurrence of a signal for the second pressure value and the condition recognition unit.

In order to accomplish the individual control tasks, the response time, the power consumption as a time function, and the operating medium temperature can additionally lead to fault indications or warnings which must be considered as additional input values for triggering the actuator of the individual valves. Additionally, the clutch fill time can also lead to a message when a certain pre-established value is exceeded.

The valve devices influencing the cross section that is to be released in the supply or drainage line of the operating chamber, can be operated mechanically, electromotively, electromagnetically, hydrostatically or pneumatically. In order to trigger the actuators, at least one signal converter is to be provided between the dynamic pressure generator or sensor and the actuator.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIG. 3a is a cross-sectional view of one embodiment of a catch trough/dynamic pressure tube arrangement of the present invention;

FIG. 4a1 is a cross-sectional view of yet another embodiment of a catch trough/dynamic pressure tube arrangement of the present invention;

FIG. 4a2 is a partial, side view of the catch trough/dynamic pressure tube arrangement of FIG. 4a1;

FIG. 4b1 is a cross-sectional view of a further embodiment of a catch trough/dynamic pressure tube arrangement of the present invention;

FIG. 4b2 is a partial, side view of the catch trough/dynamic pressure tube arrangement of FIG. 4b1;

FIG. 5b is a partial, side view of the connection of lines to a dynamic pressure tube of FIG. 5a;

FIG. 6a is a cross-sectional view of one embodiment of a device for pressure value acquisition in the area of the operating medium catch trough of the present invention;

FIG. 6b is a cross-sectional view of another embodiment of the fill segment of the device for pressure value acquisition of FIG. 6a;

FIG. 7a1 is a simplified control diagram illustrating one embodiment of a device to accomplish control functions of the present invention;

FIG. 7a2 is a simplified control diagram illustrating another embodiment of a device to accomplish control functions of the present invention;

FIG. 7d is a simplified control diagram illustrating still another embodiment of a device to accomplish control functions of the present invention;

FIG. 8b1 is a simplified control diagram illustrating the operational mode of FIG. 8a;

FIG. 8b2 is another signal flow chart illustrating one embodiment of the operational mode of the present invention during the start-up process and during cooling with the example of volumetric cooling in continuous operation; and FIG. 9 is a plot illustrating the operational mode of FIG. 8a.

Corresponding reference characters indicate corresponding parts throughout the several views. The exemplifications set out herein illustrate one preferred embodiment of the invention, in one form, and such exemplifications are not to be construed as limiting the scope of the invention in any manner.

DETAILED DESCRIPTION OF THE INVENTION

Figure 2B:
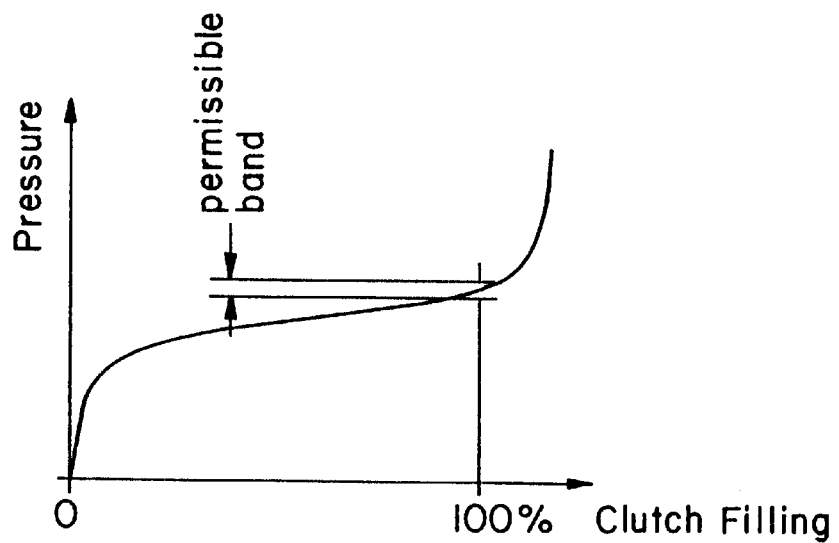
FIG. 2b is a plot of pressure versus degree of filling in the clutch of FIG. 2a, illustrating the problems associated with using a pressure valve acquired in the circuit to trigger the filling valve.
Figure 2A:
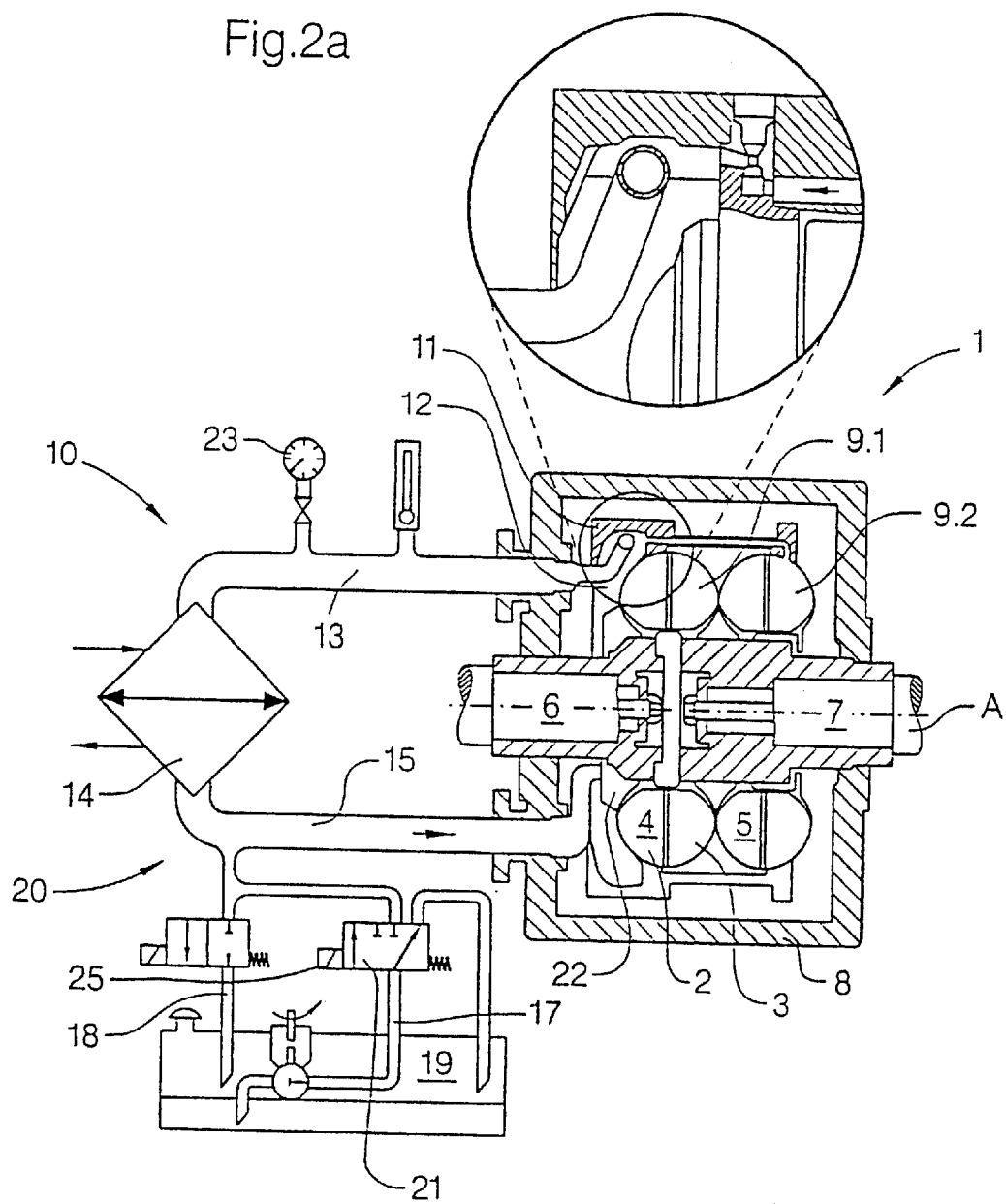
FIG. 2a is a cross-sectional view of a known hydrodynamic clutch.

Referring now to the drawings and particularly to FIG. 2a, there is shown a functional diagram of a known hydrodynamic clutch. The clutch includes two operating circuits and an signed sealed operating medium cooling circuit. FIG. 2b is a characteristic curve demonstrating the dependency of the momentary pressure p in the drainage lines on the filling degree of the clutch.

FIG. 2a is a simplified functional diagram of a known hydrodynamic clutch which is arranged as a dual circuit clutch with an enclosed operating medium circuit in an enclosed cooling circuit. In the illustrated example, this clutch 1 includes two blade wheels, one primary blade wheel 2 and a secondary blade wheel 3, which together form at least two torus-shaped operating chambers 4 and 5. The primary blade wheel 2 is linkable with a drive shaft 6 that is at least indirectly coupled with a drive motor which is not illustrated in detail here.

The secondary blade wheel 3 is linkable with a drive shaft 7 that can be coupled with the drive side for torsional strength. The two torus-shaped operating chambers 4 and 5 can be filled with an operating medium. Oil or water may be used as operating medium. During operation of the hydrodynamic clutch 1 as a torque transferring device, the operating medium is circulated in the torus-shaped operating chambers 4 and 5 and thereby forms closed operating circuits 9.1 and 9.2 between the two blade wheels, namely the primary blade wheel 2 and the secondary blade wheel 3.

To remove the heat that develops in the operating circuits 9.1 and 9.2, a cooling circuit 10 is assigned to the operating circuits 9.1 and 9.2. During operation of the hydrodynamic clutch 1, the operating medium is delivered through not-illustrated openings in the area of the outer diameter $D_{AS}$ (FIG. 4a1) of the primary blade wheels 2 to a pump shell 11. Pump shell 11 is coupled for torsional strength with the primary blade wheel 2. The pump shell 11 is arranged in radial direction relative to the clutch axis A in the area of the outer circumference $U_{AS}$ of the two blade wheels 2 and 3. In the pump shell 11, the operating medium is picked up by at least one dynamic pressure pipe 12, facing in a direction opposite to the direction of rotation. For this reason, the dynamic pressure tube, which is above the clutch axis A in the mounting position of the hydrodynamic clutch 1, protrudes into the pump shell 11. This dynamic pressure tube is a part of the coolant circuit 10 and runs into a line 13. Line 13 can serve as both a drainage line from the pump shell 11 and as a supply line to a cooling unit 14 which can be set up as a cooler or a heat exchanger. The cooling unit 14 is connected, via a line 15 with an operating medium supply trough, to the operating chambers 4 and 5. In the illustrated example, the coolant circuit 10 is an enclosed circuit. This circuit 10 may also be used for filling and emptying of the torus-shaped work chambers 4 and 5, respectively. For this purpose, a supply line 17 and a drain line 18, which are coupled with an operating medium tank 19, are at least indirectly allocated to the operating chambers 4 and 5, respectively, via the coolant circuit 10. The interconnection of these individual lines, in this instance, the supply line 17 and the drain line 18, occurs through corresponding devices in the form of valve units. The connection of the drain line 18 is achieved by use of on-off valve operating as a drain valve, for example in the form of a 2/2-way valve 20. The connection of the supply line 17 is achieved by use of an on-off valve operating as a fill valve, in the form of a 3/2-way valve 21.

In the stationary condition, there is always a constant volume of operating medium in the clutch 1, that is, in the two torus-shaped chambers 4 and 5 and in the coolant circuit 10. No liquid is then supplied to or removed from this coolant circuit 10. An increase or a reduction in the motor speed is achieved by being able to supply or remove operating medium to the clutch 1 through the use of fill or drain valves, in this example, by connecting the individual supply or drain lines 17 and 18. Filling occurs through the supply line 17 from an operating medium tank 19 into the feed line 15 which is coupled with the torus-shaped operating chambers 4 and 5 through an operating medium infeed trough. Influencing of the fill volume is accomplished through the 3/2-way valve 21, which in a first operating position $I_{21}$ (FIG. 7a1) uncouples the feed line 15 to the operating medium infeed trough from the supply line 17, and in a second operating position II21 connects the supply line 17 with the feed line 15.

In order to avoid exceeding a maximum permissible filling degree of the hydrodynamic clutch 1, specifically of the operating chambers 4 and 5, a device 23 for measuring the pressure p is allocated to the drain line. Specifically device is allocated to line 13 in the coolant circuit 10, where during operation, a part of the operating medium from operating circuit 9.1 or 9.2 is fed through a cooler back into the operating circuit for the purpose of heat removal. During the operation of the hydrodynamic clutch 1, a progressively increasing pressure p builds up with increasing motor speed as a result of releasing operating medium into the pump shell 11. This pressure p, which is then present in the coolant circuit 10, specifically in line 13, is utilized to achieve overload protection. In the known example, by exceeding the maximum permissible filling degree, pressure p in line 13 is also increased. This pressure is measured and used as an actuating signal for triggering of an actuator 25 on the 3/2-way valve 21. The supply of operating medium from the operating medium tank 10 through the supply line 17 to the operating medium infeed trough at the hydrodynamic clutch 1 is, therefore, controlled by the pressure. Triggering is generally electromagnetic. That is, the pressure signal must be converted into a corresponding electric actuating signal by a converter. The conversion function is performed by a pressure switch which is not illustrated here in detail. However, this pressure switch must be adjusted accurately at start-up, and is additionally exposed to the pressure peaks by the opened 3/2-way valve 21.

FIG. 2b illustrates a diagram in which the pressure p is plotted as a percentage that is dependent upon the clutch filling, or more precisely, the filling degree. This shows that only when a maximum filling degree, which generally is 100%, has been reached, a change in the pressure values in the lines is registered to the effect that the pressure value curve shows an increased rise. In the area of a clutch filling degree of 0% to 100%, the produced pressure p increases linearly in the piping system.

This linear increase is still present in the area of the maximum permissible clutch filling degree of 100%. Only after this filling degree has been reached, that is, when overfilling has occurred, does the pressure p change to the effect that a steeper increase or more rapid rise is registered. In order to be able to react actively in the full condition, the connector between the device 23 for measuring pressure p and the actuator 25 for influencing the supply volume to the hydrodynamic clutch 1 is restricted in its reaction to a small range. The actuator 25 is triggered only when a pressure p occurs that is within the stated range. This pressure value must, however, be established as accurately as possible by the acquisition device. Additional disturbances, which could affect the pressure value in the system, could falsify the result that is to be established. It is therefore difficult with such a system to precisely determine the exact timing of clutch filling to full level, that is, maximum permissible filling degree, and at the same time avoid overfilling by quick reaction. Specifically, the quick reaction is by triggering of the actuator 25 for influencing the supply volume to the work chambers. This drive, therefore, is very inaccurate and subject to errors.

Figure 1A:
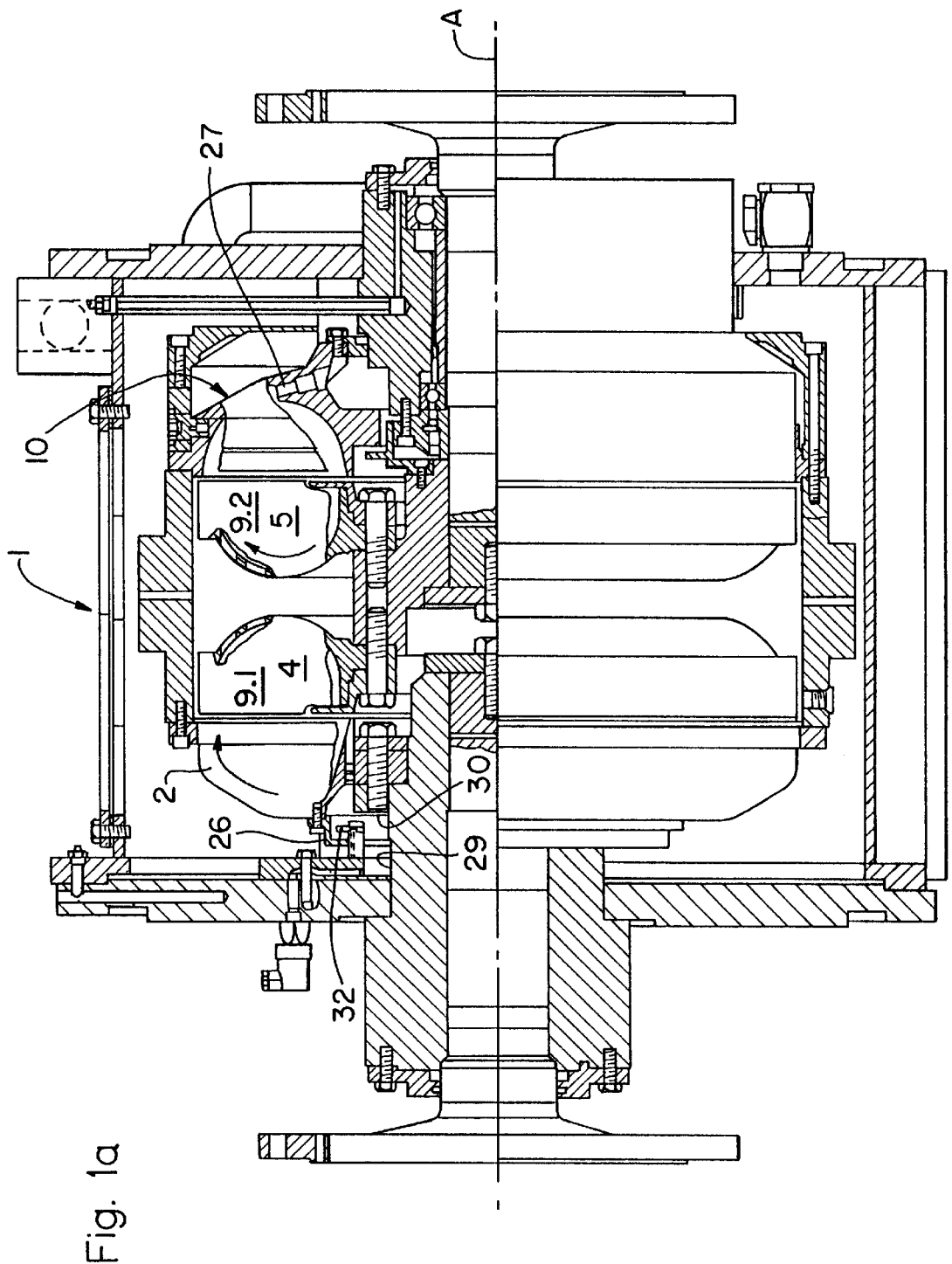
FIG. 1a is a cross-sectional view of one embodiment of a hydrodynamic clutch of the present invention, including overfill protection and two operation circuits.

FIG. 1, with the aid of a hydrodynamic clutch 1 as described in FIG. 2, illustrates a method according to the invention of accomplishing overfill protection. The basic design of the hydrodynamic clutch 1 corresponds substantially with that which is described in FIG. 2a. Therefore, the same reference identifications are used for identical components.

In this example too, the hydrodynamic clutch 1 includes a cooling circuit 10 that is allocated to the operating circuit, as well as supply lines 17 and drain lines 18 which are allocated to the operating chambers 4 and 5. A so-called catch trough 26 is allocated to the operating chamber, or more precisely chambers 4 and 5, which is preferably arranged in the direction of rotation of the hydrodynamic clutch 1. Catch trough 26 is arranged in a radial direction relative to the clutch axis A in an area which extends at a maximum, relative to the dimensions in radial direction, across the maximum diameter of operating chamber 4 or 5. This catch trough 26 is connected with operating chamber 4 or 5, permitting interaction. The connection may take the form of a clearance opening 27 which may vary in its configuration and be integrated in the primary blade wheel 2 in radial direction in an area between an outer diameter of trough 26 corresponding to the radial outer limitation of catch trough 26, and the areas having the smallest diameter. This limits the catch trough 26 in the radial direction to, for example, areas 29 and 30. The clearance openings 27 may be located either in the blade-free radially located interior area of the primary blade wheel 2, or preferably, in the blade base of the part of the primary blade wheel 2 which carries the blades. The positioning of the catch trough 26 and the clearance opening 27 relative to the blade wheel will depend on the desired fill, in dependency on the degree of filling of clutch 1. The clearance openings 27 may be in the form of circular clearance bores, or in the form of elongated holes which extend at least along a section of the blade wheel circumference on a determined diameter.

The filling degree in the accumulation chamber 40 (FIG. 3a) defined by catch trough 26 that is determined by the filling degree in the hydrodynamic clutch 1, specifically the operating chambers 4 or 5 and the configuration of the clearance openings 27, is measured by a dynamic pressure tube 32. The dynamic pressure tube 32 is designed and arranged such that filling with liquid will occur only after a filling degree in the catch trough 26 is reached, which corresponds to a maximum permissible filling degree in the operating chambers 4 or 5.

By filling of pressure tube 32, a so-called dynamic pressure $P_{dynamic}$ is acquired, which corresponds to a second increased pressure value $p_2$ vis-a-vis a first pressure value $p_1$ without filling of the dynamic pressure tube 32 with operating medium. Dynamic pressure $P_{dynamic}$ serves as a controller output for activation of the 3/2-way valve 21 for influencing the supply volume of operating medium to the operating circuit 9.1 or 9.2. The maximum permissible filling degree, preferably, is consistent with a maximum filling degree of 100%.

On partial filling, that is, a filling degree less than the maximum permissible filling degree, an operating medium exchange also occurs between the catch trough 26 and the operating chambers 4 or 5. However, no dynamic pressure $P_{dynamic}$, or only a negligibly low pressure p is measured in the dynamic pressure tube 32. In this example, no signal for activation of the actuator 25 of the 3/2-way valve 21 is delivered. This signal is produced only when the maximum permissible fill volume is reached.

The maximum permissible fill volume may be established by the upper filling limit, a filling degree of 100%, or may be freely selected between a filling degree of 0% and 100%. According to the filling degree, the opening of the dynamic pressure tube 32 is to be always located in an accumulation chamber 40 that can be filled with operating medium reaching an operating medium level.

Figure 1B:
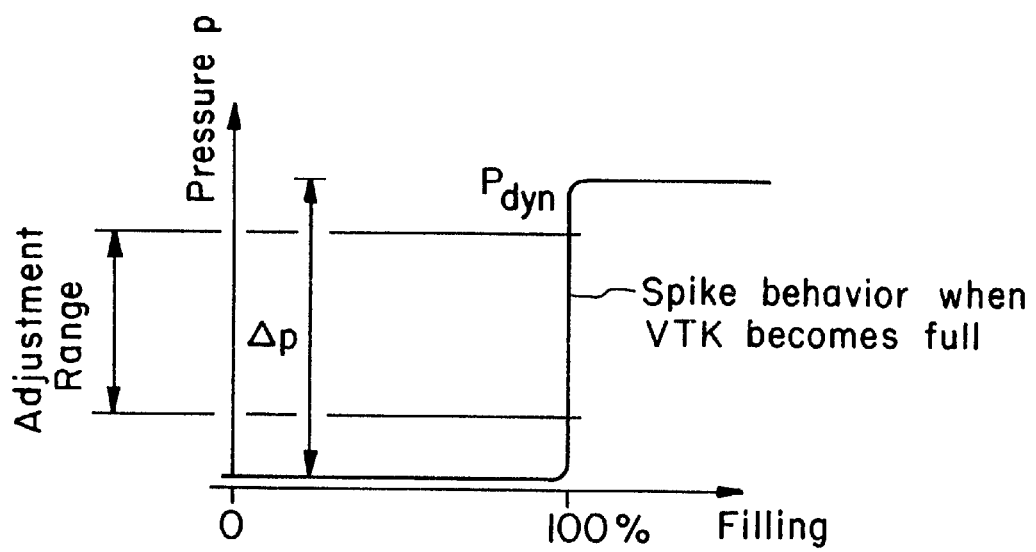
FIG. 1b is a plot of pressure versus degree of filling in the clutch of FIG. 1a, with the plot being intended to clarify the operational mode of the overfill protection.

In FIG. 1b, the dependency of the established dynamic pressure values on the clutch filling is plotted for the method according to the invention. This shows that on partial filling, that is, during an operational condition of the hydrodynamic clutch 1 in which the liquid level in accumulation chamber 40 of the catch trough 26 is below the dynamic pressure tube 32, a pressure value p in the dynamic pressure tube 32 is determined which is substantially consistent with the atmospheric pressure. When the dynamic pressure tube 32 immerses into the operating medium in the accumulation chamber 40 and a dynamic pressure of $p_{dyn}=(\rho/2)\times v^2$ is measured, immersion of the dynamic pressure tube 32 into the operating medium present in catch trough 26 occurs only after a certain filling degree has been reached, i.e., 100%. Only then is a second surging pressure value p, or a significant change in pressure value $\Delta p$, established in the pressure tube which is used as a recognition characteristic for achieving the maximum permissible filling degree in operating chamber 4 or 5. The signal spike is clearly defined in (FIG. 1b) and is of a magnitude such that it is recognizable even under the influence of disturbances.

Figure 3B:
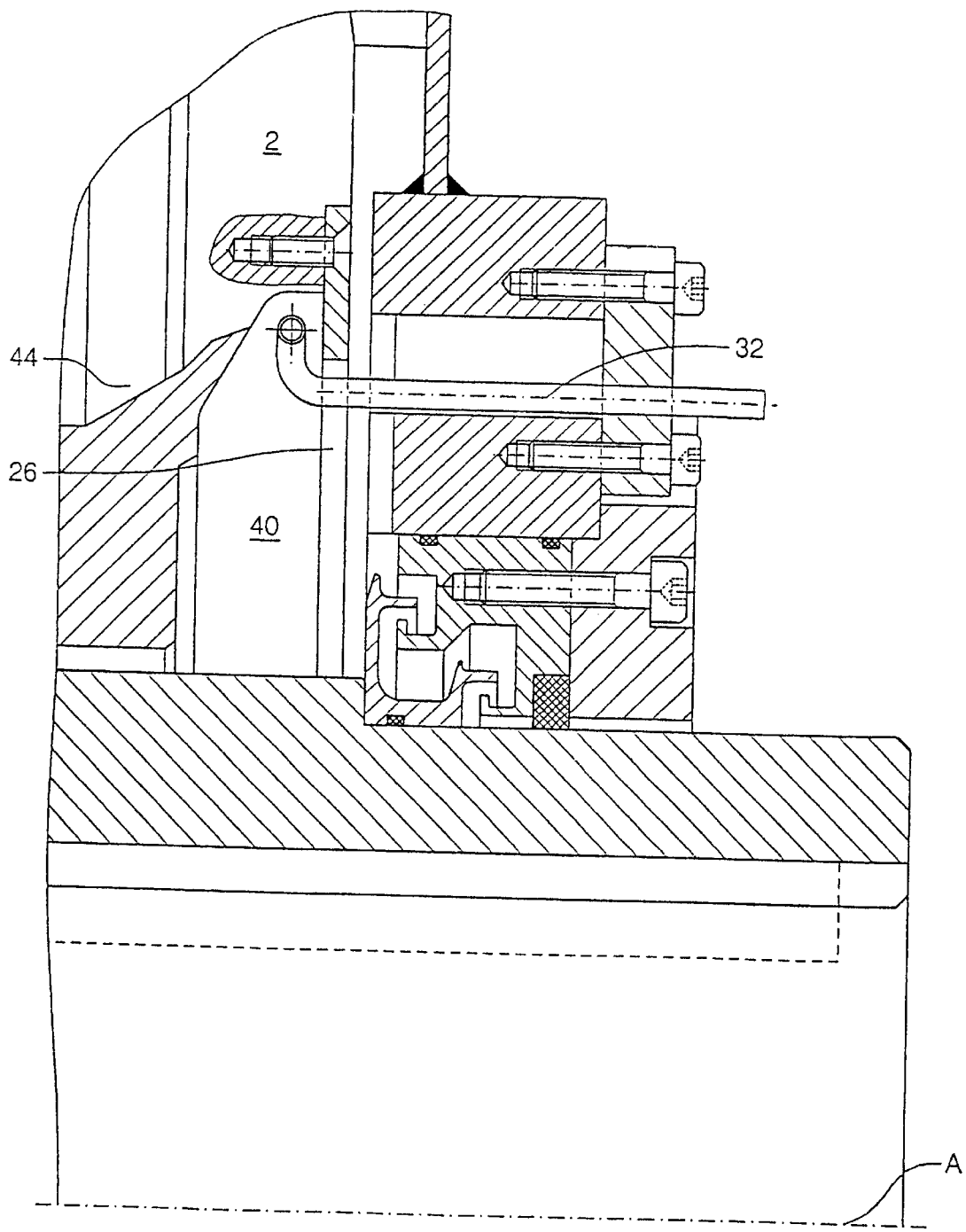
FIG. 3b is a cross-sectional view of another embodiment of a catch trough/dynamic pressure tube arrangement of the present invention.

FIGS. 3a and 3b clarify in a close-up segment of a blade wheel, preferably the primarily blade wheel 2, a further possible method of connection between the operating chamber, in this example operating chamber 4, the catch trough 26 and the accumulation chamber 40. The connection is established by the catch trough 26 and the outer contour 37 of the primary blade wheel 2.

FIG. 3a shows a segment of a primary blade wheel 2 to which a catch trough 26 is allocated. The catch trough 26 is formed by a discord element 50 which is detachably coupled with the primary blade wheel 2. The outer contour 37 of the primary blade wheel 2 and the catch trough 26 form an accumulation chamber 40. A device in the form of a dynamic pressure tube 32, intended to at least directly measure a value characterizing the filling degree, protrudes into this accumulation chamber 40.

The catch trough 26 extends radially into an area which is in the area of the operating chamber 4, or at its height. The connection between the accumulation chamber 40 and the operating chamber 4 occurs through an inclined clearance opening 27.1 which extends from the blade wheel base 36 to the blade wheel outside 37, which at the same time forms an outer limit surface for the catch trough 26.

In the illustrated example, the accumulation chamber 40 is arranged in radial direction in an area which, in radial arrangement, corresponds with blading 44.

FIG. 3b illustrates arrangements of a catch trough 26 and an accumulation chamber 40 which are arranged in radial direction in the radial interior area of the primary blade wheel 2. Here, the catch trough 26 is positioned in a radially located internal area of blading 44 of primary blade wheel 2. In mounting position, arrangement of the dynamic pressure tube 32 will be dependent upon the filling degree that is to be limited, in the illustrated example, above clutch axis A.

FIGS. 4a and 4b provide additional actual designs. FIG. 4a1 clarifies a section of the primary blade wheel 2 which is allocated to a catch trough 26, whereby the catch trough 26 is located in an area between the inside diameter $D_{IS}$ and the outside diameter $D_{AS}$ of blading 44. Here, the catch trough 26 extends in radial direction into an area which is located in the area of the operating chamber 4, or at its height. The connection between the accumulation chamber 40 and the operating chamber 4 occurs through an inclined clearance opening 27.1 which extends from the blade wheel base 36 to the blade wheel outside 37, which at the same time forms an outer limit surface for the catch trough 26. The catch trough 26 is formed only by a ring-shaped component 38. The pressure tube 32.2 extends through the ring-shaped component 38 and protrudes into the accumulation chamber 40 which is formed by the catch trough 26. The pressure tube 32.2 is configured in such a way that the opening area 41.2, in mounting position in radial direction above the clearance, is positioned through the ring-shaped component 38. The component 42.2 that is equipped with the opening extends preferably substantially parallel to an operating medium level 43 in the accumulation chamber 40.

FIG. 4a2 illustrates a view I—I consistent with FIG. 4a1. This shows the position of the part 42.2 that is equipped with the opening area 41.2. Because of the positioning of the opening area 41.2 in circumferential direction during changing operational modes, that is, reverse operation, a second dynamic pressure tube 32.1 becomes necessary. Opening area 41.1 of tube 32.1 extends in a direction opposite to that of opening area 41.2, relative to the circumferential direction. The two pressure tubes 32.1 and 32.2 are connected with a common line 49 through their respective line segments 47 and 48 by a return valve 46.

FIG. 4b1 illustrates an embodiment of a catch trough 26 which is positioned in the radially located internal area of the primary blade wheel 2. Here, the catch trough 26 is arranged in a radially located internal area of the blading 44 of primary blade wheel 2. Here too, the accumulation chamber is limited by the inside diameter $d_R$ of catch trough 26, the outer contour 37 of primary blade wheel 2, and the areas 29 of the components that are connected for torsional strength with primary wheel 2.

As illustrated in FIG. 4a1, the connection of accumulation chamber 40 with the operating chamber 4 is accomplished through clearance openings 27.1 which are not illustrated here. Under certain conditions, however, there is the possibility of making the connection between the operating chamber 4 and the accumulation chamber 40 through clearance openings which are arranged in the radially located internal section of the primary blade wheel 2 which is free of blading 44.

Here, the operating medium level 43 is at the height of the opening area 41.2 of dynamic pressure tube 32.2. In this variation too, the dynamic pressure tube 32.2 is designed in such a way that the opening area 41.2 is positioned in circumferential direction and immerses into the operating medium in accumulation chamber 40. In mounting position, the positioning of dynamic pressure tube 32 is, according to the desired filling degree that is to be limited, at an established distance from clutch axis A. In the illustrated example, the dynamic pressure tube 32.2 is located above the clutch axis A.

A second dynamic pressure sensing device in the form of a second dynamic pressure tube 32.1 is necessary here too for rotation direction changes, because of the positioning of the component of pressure tube 32.2 which protrudes into the opening area. This is illustrated in a close-up II—II in FIG. 4b2. It is clearly visible that both opening areas 41.2 and 41.1 are positioned in opposite direction to each other, in circumferential direction. In this instance too, both dynamic pressure tubes 32.1 and 32.2 are connected with a common line 49 via lines 47 and 48 which are connected with each other through a return valve 46.

In both examples (FIGS. 4a and 4b), the catch trough 26 is formed with the help of a ring-shaped component 38 which is connected for torsional strength with the primary blade wheel 2. However, it is possible to configure the catch trough 26 as a structural component, together with the primary bucket wheel 2.

Further, in the arrangements illustrated in both drawings, the dynamic pressure tube 32 is located in component 55 at the housing.

Figure 5B:
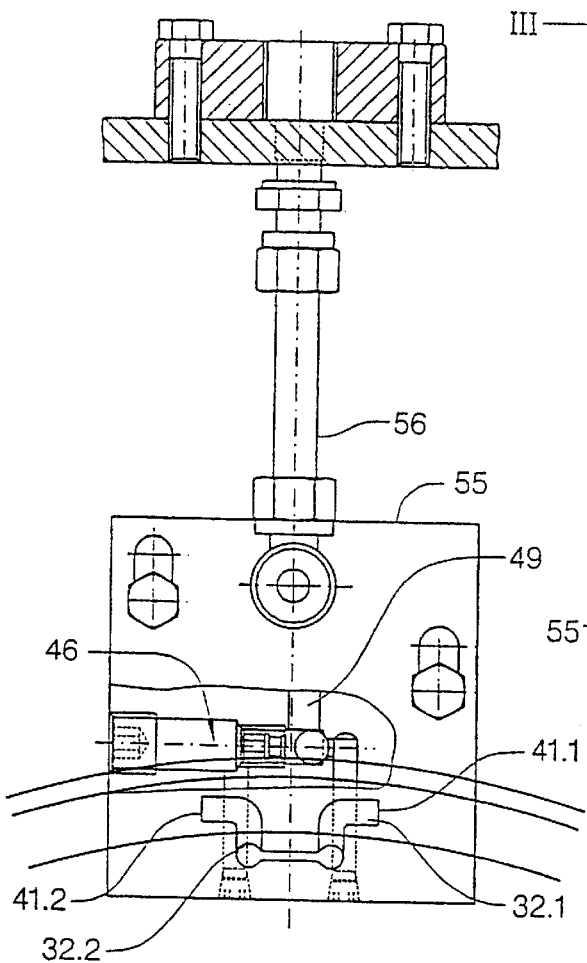
Figure 5A:
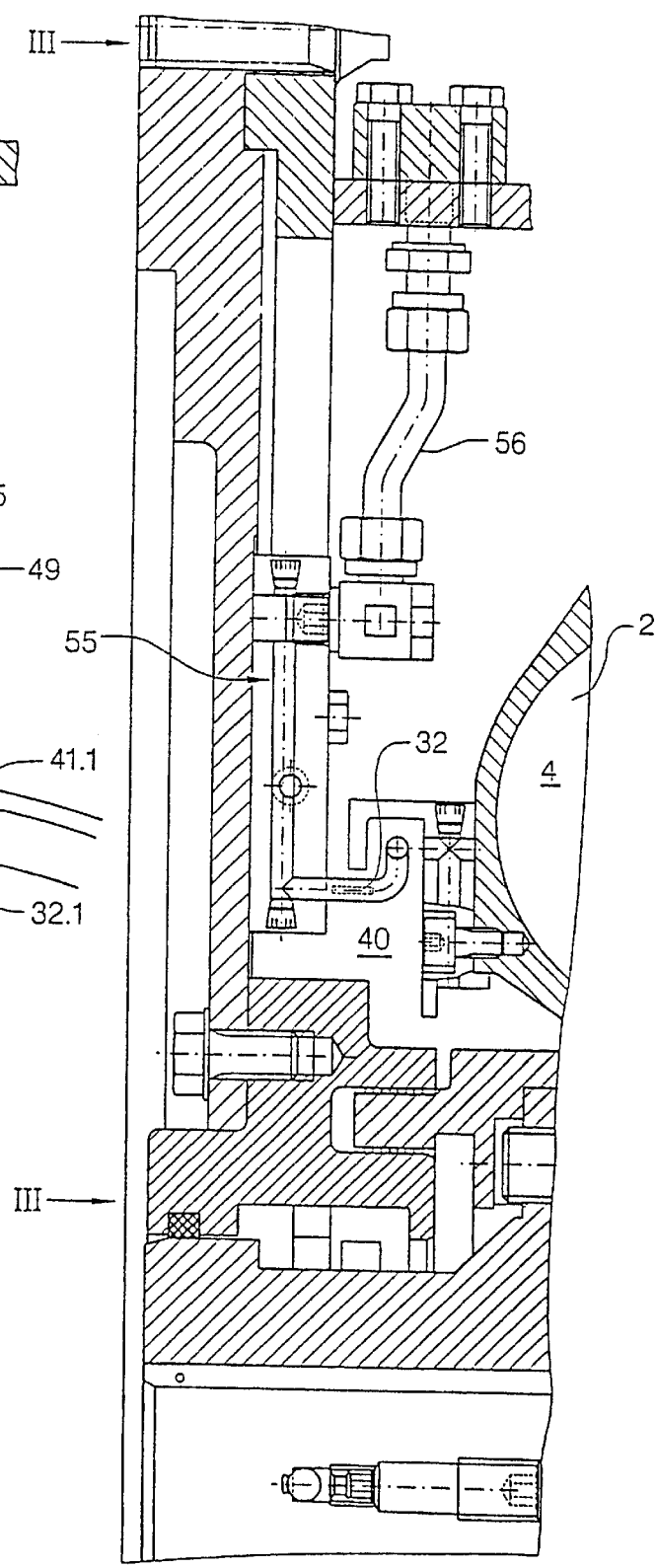
FIG. 5a is a cross-sectional view of one embodiment of a connection of lines to a dynamic pressure tube of the present invention.

FIGS. 5a and 5b clearly illustrate a further possible design arrangement for the dynamic pressure tube 32. The component 55 supporting the dynamic pressure tubes 32.1 and 32.2 is mounted on the housing. In contrast to the methods illustrated in FIGS. 4a and 4b, the line from the dynamic pressure tube 32 runs through a pipe joint connection 56 which is mounted on the housing wall. FIG. 5b clearly illustrates a view III—III in accordance with FIG. 5a.

The basic construction of blade wheel 2, operating chamber 4 and allocated accumulation chamber 40, as well as the reach of the dynamic pressure tube 32 into the catch pan 26, corresponds to the arrangement described in FIGS. 4a1, 2 and 4b1, 2 and does not need to be addressed further here. The same identifications are used for identical components.

FIGS. 3 through 5 only illustrate examples for the configuration of the catch trough and the clearance openings. There are other possibilities which perform the same function. Depending on the configuration of the clutch with either one or more operating chambers, the catch trough could, in the first mentioned example, be allocated either to the primary blade wheel, to the secondary blade wheel or to a shell. In the last mentioned example however, it can be allocated only to the primary blade wheel. The catch trough itself would be constructed as a separate component or as a component with the corresponding blade wheel.

Figure 6B:
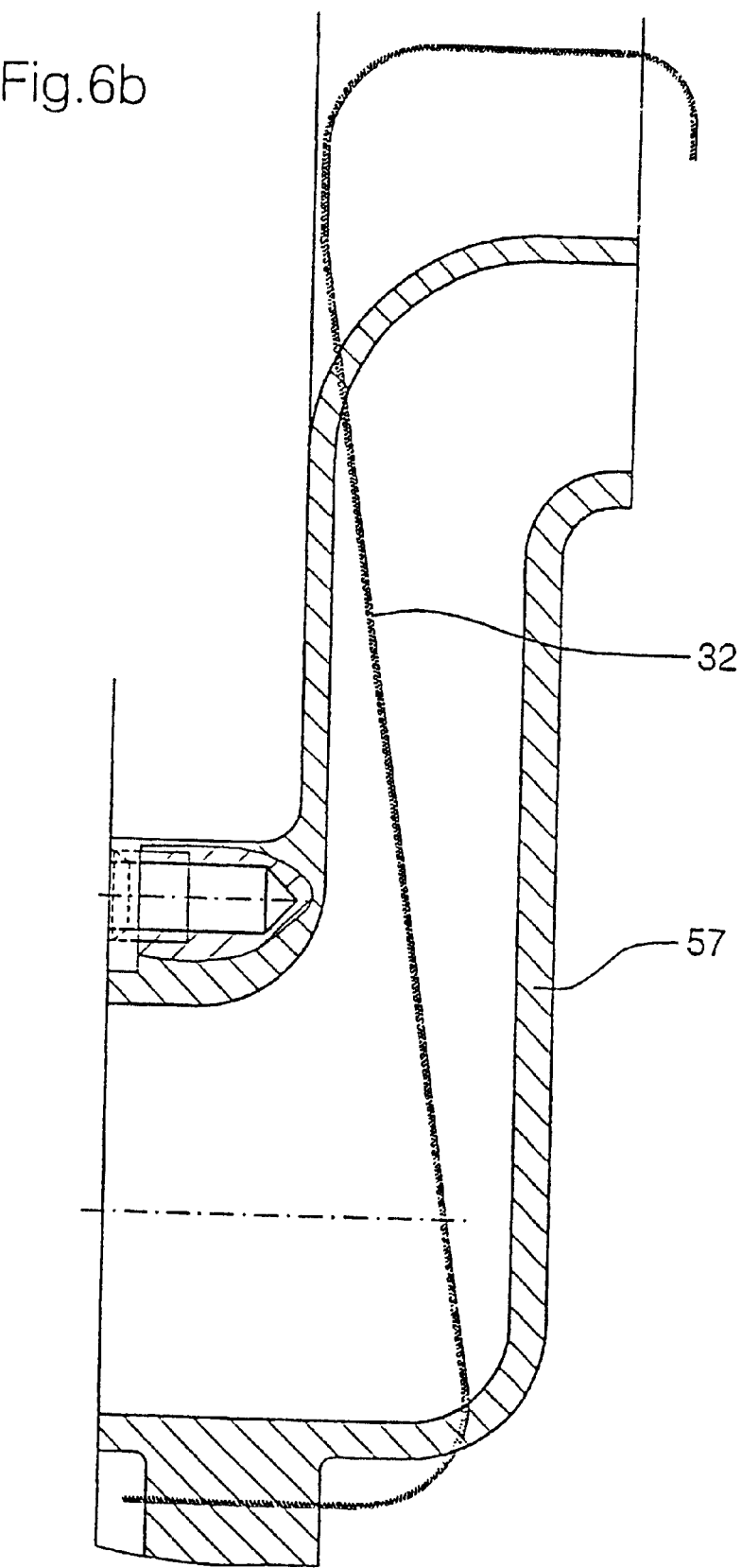

In an advantageous embodiment which is not completely illustrated in detail in FIG. 6, the operating medium catch trough 22 is used in operating circuit 9.1 or 9.2 as a catch trough or for pressure value measuring. Preferably, this also extends on an established diameter around the entire circumference. The dynamic pressure tube 32 may be located in the operating medium catch trough 22, that is, in an area below the clutch axis A in the radially located internal area of the blade wheel. The blade wheel is, in this example, the primary blade wheel 2. Draining from the catch trough 22 occurs only until the clutch is filled. From that point on, no further draining occurs from the operating catch trough 22. For this purpose, the dynamic pressure tube may also be located in the fill segment 57, which is allocated to the operating medium catch trough 22. Such an arrangement possibility is illustrated in FIG. 6b. This shows only the fill segment 57 and a schematically simplified positioning of the dynamic pressure tube 32.

FIGS. 7a through 7d illustrate, in the form of simplified control diagrams, the utilization of the dynamic pressure value $P_{dynamic}$, that is established by a dynamic pressure generator or sensor. FIGS. 7a through 7d also illustrate the utilization of a pressure signal produced by this device and used for triggering an actuator for influencing the operating medium supply to operating chamber 4 or 5 of hydrodynamic clutch 1.

The block diagrams in FIGS. 7a1 and 7a2 clarify the general possibility of utilizing the dynamic pressure $P_{dynamic}=\rho/2 \cdot v^2$ which is provided by a dynamic pressure generator or sensor. A control unit 60 includes at least one control device 61 for this purpose which includes a first input 62 and a first output 63. This first input 62 may be at least indirectly coupled with the dynamic pressure generator or sensor, while the first output 63 may be at least indirectly coupled with the device that is intended to influence the operating medium supply to the operating chamber. Here, this device takes the form of a valve unit, preferably in the form of a 3/2-way valve and is identified with reference number 64.

A pressure signal is supplied to the control unit 61 through the first input 62. This pressure signal is created either by the first pressure value $P_1$ or by the second increased pressure value $P_2$. Consistent with the signal present at input 62, the controller output Y for triggering the device intended to influence the operating medium supply to the operating chamber of the hydrodynamic clutch is created at the output 63. If the first pressure value $P_1$ is present at input 62, the controller output would equal zero, that is, no signal is created for triggering the device intended to influence the operating medium supply to the operating chamber of the hydrodynamic clutch 1. When a second, increased pressure value is present which preferably corresponds directly to the hydrodynamic pressure $P_{dynamic}$ as established by the dynamic pressure generator or sensor 32, a controller output Y is provided at output 63 which causes the device 64 intended to influence the supply volume to the operating chamber of the hydrodynamic clutch to take a position so that the infeed to the operating chamber, and therefore the operating medium supply to the operating chamber, is interrupted. Since these devices intended to influence the supply volume are generally valve units, the controller output Y is issued in a form which becomes effective on the actuators 65 of the device intended to influence the supply volume to the operating chamber of the hydrodynamic clutch. The activation of the actuators 65 may be electric, pneumatic, hydraulic or mechanical. The controller output Y is to be created according to the selection of the actuator device 65. Activation of the device intended to influence the supply volume to the operating chamber of the hydrodynamic clutch 64 should preferably be electromagnetic.

In the simplest form, the valve unit 64 is designed with a readjusting device, for example a spring device which, when a reduction in force occurs at the actuating device 65, adjusts the operating position $II_{21}$ at the valve unit 64, due to its readjustment capabilities. With electromagnetic triggering of the valve unit 64 for adjustment of operating position $I_{21}$, a controller output Y is created which causes an interruption of power supply.

Preferably however, the entire triggering process of valve unit 64 will be assumed by the control unit 60. As illustrated in FIG. 7a2, an additional input 75 is allocated to the control device 61 for the provision of a signal to fill the operating chamber of the hydrodynamic clutch. The second input 75 is linkable to a device for provision of a signal to fill the hydrodynamic clutch. If a signal is present at the second input, which is targeted at least indirectly to a desired filling of the clutch, a controller output is given which serves to trigger the valve unit 64. Specifically, the actuator is activated with a controlling torque in such a way that the valve unit at least partially releases the line for filling the operating chamber. An additional presence of a signal for the first pressure value $P_1$ at the first input 62 then has no effect whatsoever on the controller output Y. If however, the second, increased pressure value $p_2$ is present at the first input 62, this has priority over the filling signal. In this instance, the controller output Y is formulated such that the valve device adopts an operating position whereby the operating medium supply to the operating chamber is reduced or interrupted.

The control device 61 may be designed as a separate control unit. A design in the form of a simple converter is possible, which would serve the conversion of input signals into output signals of varying strengths. The individual control functions can, for example, be fulfilled by a microprocessor control or by control elements which would be coupled appropriately with each other.

Figure 7B:
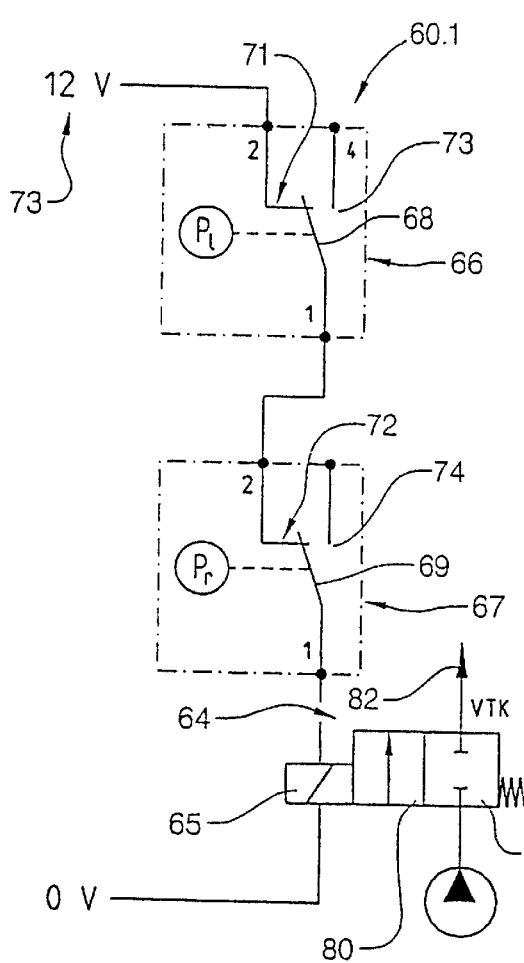
FIG. 7b is a simplified control diagram illustrating yet another embodiment of a device to accomplish control functions of the present invention.

FIG. 7b is a control schematic for a pressure switch connection, illustrating the minimum equipment of control unit 60.1. Here, this includes two pressure switch devices, a first pressure switch device 66 and a second pressure switch device 67, which are used for different directions of rotation of the rotor parts of hydrodynamic clutch 1. The first pressure switch device 66, for example, is intended for a rotational direction to the left, while the second pressure switch device 67 can only be activated at a rotational direction to the right. The pressure switch devices 66 and 67 are coupled with a power source and form the connecting elements to the actuator 65 of the device 64 for influencing the supply volume to the operating chamber of the hydrodynamic clutch, here in the form of a 2/2-way valve. Both pressure switch devices 66 and 67 are arranged in series. Their respective control elements 68 or 69 in their first operating positions 1/2 or 1/2 enable a connection between a power source and the actuator 65 of the device 64 intended to influence the supply volume to the operating chamber of the hydrodynamic clutch. In a second operating position 1/4 or 1/4, this connection is interrupted. The control devices 68 or 69 are operated in dependency on the dynamic pressure $P_{dynamic}$ which is captured by the dynamic pressure generator or sensor 32 and which is consistent with the second, increased pressure value $p_2$. The dynamic pressure $P_{dynamic}$ may be used directly or only indirectly for activating the control elements 68 or 69.

The device intended to influence the supply volume to the operating chamber of the hydrodynamic clutch, the 2/2-way valve, also has at least two operating conditions, a first operating position 80 and a second operating position 81. In the first operating position 80, an operating medium supply unit, which is not illustrated in detail here, is coupled with the operating chamber. The operating medium supply unit can also be coupled with the supply line 82 to the operating chamber of the hydrodynamic clutch. In the second operating position 81, the operating medium flow between the operating medium supply unit and the supply line 82 is interrupted. The method according to the invention is based on a so-called black-white principle in which, for the two filling degree conditions, substantially only two different pressure values or pressure value conditions are established. Thus, these two pressure value conditions can be transferred to the actuation of the control elements 68 or 69 of pressure control devices 66 or 67.

Only when measuring a dynamic pressure value $P_{dynamic}$ is the corresponding pressure switch device operated so that the control elements 68 or 69 are moved in the respective control positions 1/2 or 1/2, or 1/4 or 1/4. This permits or interrupts a connection between a power supply source and the actuator 65 of the device 64 intended to influence the supply volume to the operating chamber of the hydrodynamic clutch in such a way that it adopts either the first operating position 80 or the second operating position 81.

Figure 7C:
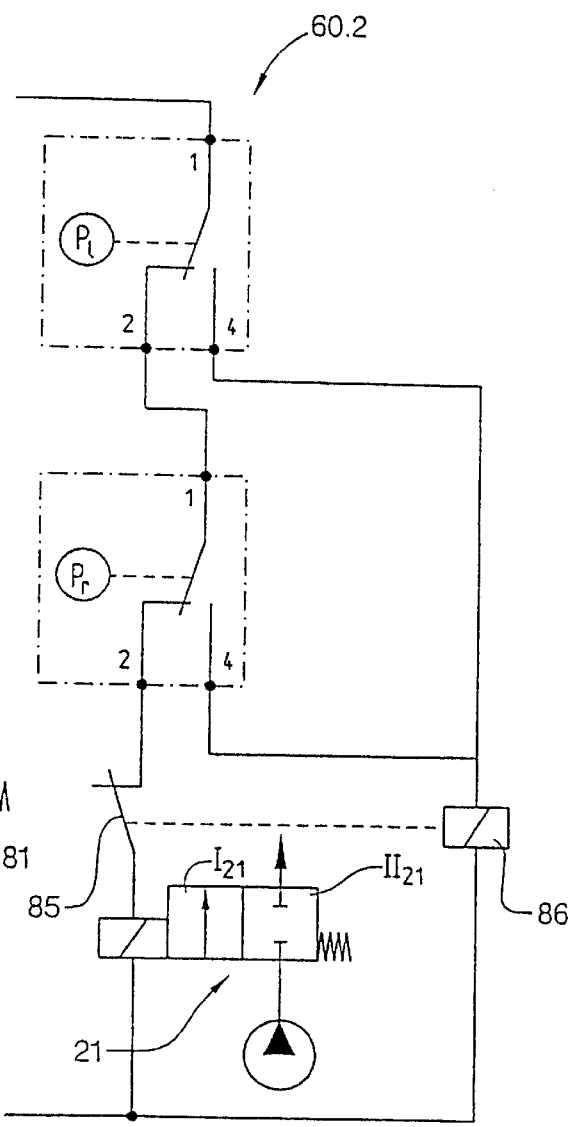
FIG. 7c is a simplified control diagram illustrating a further embodiment of a device to accomplish control functions of the present invention.

FIG. 7c illustrates one form of a control device 60.2, in accordance with FIG. 7b, but with an additional safety feature. The basic construction is substantially as described in FIG. 7b. Here too, the individual switches 68 or 69 of the individual pressure switch units 66 or 67 respectively, are activated by the dynamic pressure produced by the dynamic pressure generator or sensor, or by a pressure value proportional to it. Corresponding to the activation of the control elements and depending on the direction of rotation of the rotor parts of the hydrodynamic clutch, the device 64, which is intended to influence the supply volume to the operating chamber of the hydraulic clutch, and its actuator 65 are also activated. In addition, a third switch 85 is provided which serves to interrupt the electric connection between the actuator 65 and the individual pressure switch units 66 and 67. This additional switch 85 is triggered via an interlocking device 86. The triggering is preferably accomplished electrically, but may also be mechanic, hydraulic or pneumatic. This additional interlocking by use of the interlocking element 86 permits a short circuit on the device for influencing the operating medium supply volume to the operating chamber.

FIG. 7d illustrates a further development of the minimal design of FIG. 7b. In this example, the control device is identified with 60.3. As already described in FIGS. 7b and 7c, this also includes two pressure switch devices 66 or 67. Here too, these two pressure switch devices are allocated to a rotational direction of the rotor parts of the hydrodynamic clutch 1. The first pressure switch device 66 is arranged for a rotational direction to the left and the second pressure switch device is arranged for a rotational direction to the right. Depending on the configuration of the dynamic pressure generator or sensor 32, these two pressure switch devices 66 and 67 are generally coupled with a separate dynamic pressure pipe that is positioned for the appropriate direction of rotation, or with the dynamic pressure generator or sensor unit. The coupling is substantially limited so that the actuation signals for operation of the switches 68 or 69, of the two pressure switch units 66 or 67, directly affect the switches 68 or 69. The pressure signal may be consistent with the produced dynamic pressure $P_{dynamic}$, or it may be proportional to it. However, an arrangement is also possible in which a value that is at least proportional to the dynamic pressure, but which may possess a different dimension, may activate the switches 68 or 69. The activation may always occur directly, or indirectly through additional intermediate values.

Via the switches 68 or 69, each of the two pressure switch units 66 or 67 permits an adjustment or disconnection of the linkage of the actuator 65 of the device 64 for influencing the operating medium supply to the operating chamber of the hydrodynamic clutch with a power supply which is not illustrated in detail here. The connection is made in operation position 1/2 or 1/2 respectively, of the two pressure switch devices. In the other operating position 1/4 or 1/4, respectively, uncoupling between the power supply and the actuator 65 occurs.

In order to avoid overfilling during a short-term drop of the signal from the fill level recognition unit, which is generally the dynamic pressure generator or sensor, time delay relays 90 or 91 are installed following each of the two pressure switches 66 or 67. The time delay relays 91 is allocated to pressure switch device 66 and time delay relay 90 is allocated to pressure switch device 67. The individual time delay relays 90 or 91 are arranged so that they prevent overfilling of the clutch during a short-term drop of the signal for the second pressure value P2. This time period may be randomly selected or may be firmly established in accordance with the design arrangement of the time delay relays 90 or 91. Preferably, a delay period of between 0 and 5 seconds is selected. For the control unit 60.3 illustrated in FIG. 7d, this specifically means that on recognition of the maximum filling degree, the first pressure switch device 66 is triggered based on production of a dynamic pressure in the dynamic pressure generator or sensor. For example, at a rotational direction to the left, device 66 is triggered by the established dynamic pressure $P_{dynamic}$ or by a value proportional to it. During this process, control element 68 moves into operating position 1/4. The pressure switch device 66 effects turning off of the time delay relay 91.

The arrangements described in FIGS. 7b through 7d, particularly the individual control functions, may also be accomplished by use of a microprocessor. In this instance, it is also possible that other conversion units are utilized for conversion of the value that characterizes the dynamic pressure into a value consistent with the dimension for triggering of the actuator 65.

The actual form and allocation of the different components necessary to accomplish the discussed functions are at the discretion of the individual experts.

Figure 8A:
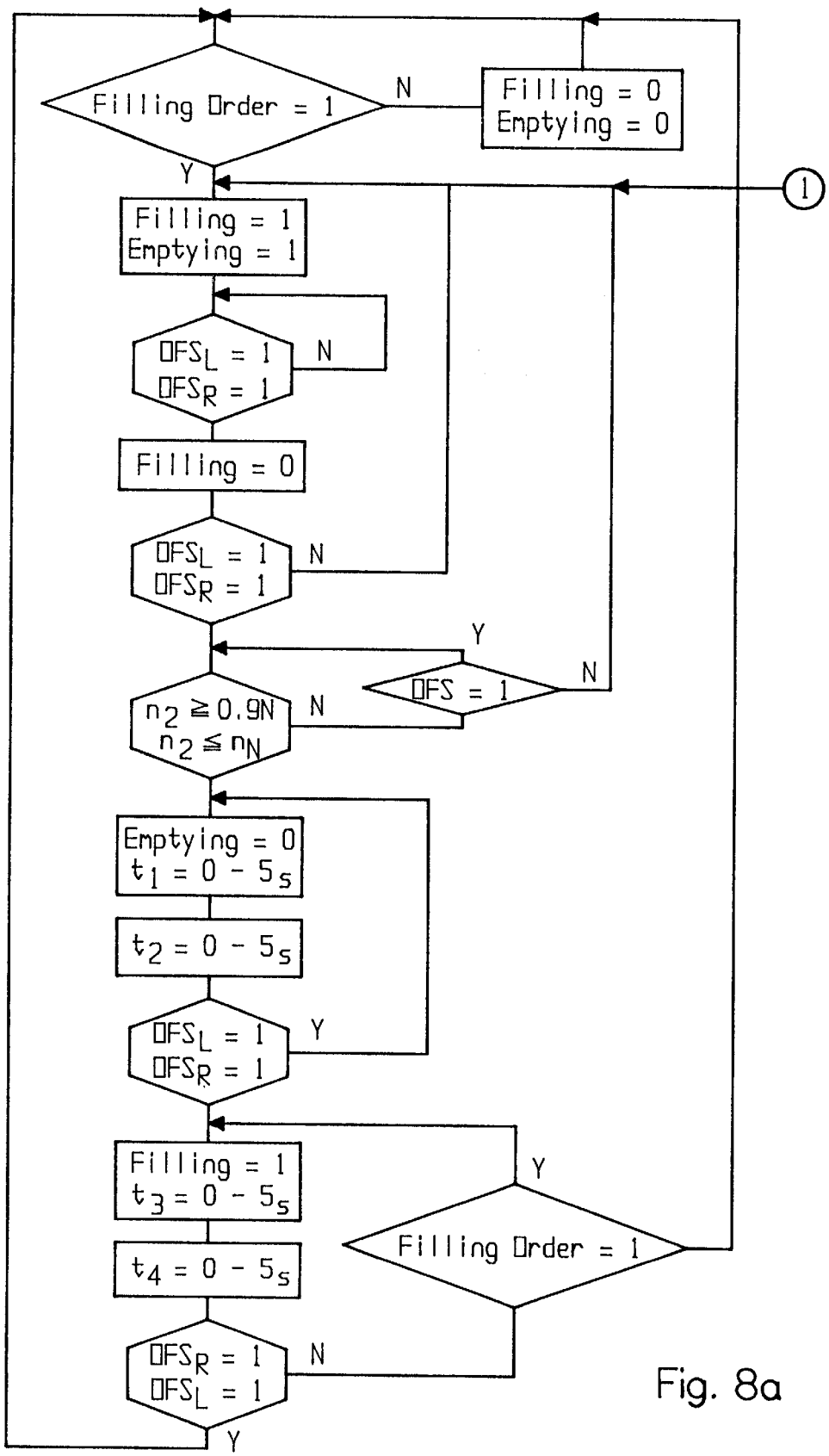
FIG. 8a is a signal flow chart illustrating one embodiment of the operational mode of the present invention during the start-up process and during cooling with the example of volumetric cooling in continuous operation.

FIG. 8a illustrates in the form of a signal flow chart, the possible procedure for adjustment of a defined filling or a pre-established filling degree, by adjusting the position of the dynamic pressure pump of the hydrodynamic clutch, particularly during operation. The individual designations in the flow chart are explained in the following legend listing for FIGS. 8a and 8b.

| Legends for logic flow charts | |
|---|---|
| Filling = 1: | Fill valve open; supplying of operating medium |
| Emptying = 1: | Drain valve closed; no removal of medium |
| ÜFS$_r$ = 1: | Fill level recognition actuated; rotational direction: right |
| ÜFS$_l$ = 1: | Fill level recognition actuated; rotational direction: left |
| ÜFS = 1: | Fill level recognition actuated (left or right) |
| n$_2$ ≧ 0.9 n$_N$: | Drive speed at which the fill recognition operates reliably |
| n$_2$ ≦ n$_N$ | |
| Fill order = 1: | Order from the line to fill the VTK |
| Filling = 0: | Fill valve closed; no supply |
| Emptying = 0: | Drain valve open, VTK being emptied |
| t$_1$ = 0–5 s: | Timing for emptying (Emptying = 0) |
| t$_2$ = 0–5 s: | Waiting time (Emptying = 1) |
| t$_3$ = 0–5 s: | Timing for filling (Filling = 1) |
| t$_4$ = 0–5 s: | Waiting time (Filling = 0) |

-continued

Legends for logic flow charts $t_5 = 0\text{–}5\ s$:     Waiting time water exchange (Filling = 1)
$T \geq 50°\ C.$ (higher?):     Disturbance excess temperature
$T \leq 30°\ C.$ (higher?):     permissible temperature after water exchange It is important whether a fill order, that is, a signal to trigger the device 64 for influencing the supply volume to the operating chamber of the hydrodynamic clutch, is present. It this signal has been given, the device 64 for influencing the supply volume is triggered so that it, for example, connects an operating medium supply unit in the form of a tank with the operating chamber or with the supply line to the operating chamber of a hydrodynamic clutch 1. The drain from the operating chamber of the hydrodynamic clutch is closed. During the filling process, verification is made as to whether a signal for a second, increased pressure value $p_2$ from the filling degree condition recognition unit is present. That is, verification is made as to whether the fill level recognition ÜFS in the accumulation chamber has been actuated. Preferably, the signals of both devices for different directions of rotation of the rotor parts of the hydrodynamic clutch are each monitored. If only the first pressure value $p_2$ is established, that is, the fill level recognition has not responded, the opening area of the pressure generator or sensor is in the operating medium free chamber, the filling process will be continued. When a signal for the second, increased pressure value $p_2$ is present, that is, on actuation of the fill level recognition ÜFS, the device for influencing the supply volume to the operating chamber of the hydrodynamic clutch is triggered and the operating medium supply to the work chamber is immediately interrupted, generally by closing of the fill valve. Following this interruption, the fill level is still monitored. If the fill level recognition device does not provide a signal, that is, if only the first pressure $p_1$ is established, filling will continue. When the second pressure value $p_2$ is measured, that is, when the filling degree which corresponds with the maximum permissible filling degree has been recognized, further verification takes place as to whether the speed $n_2$ of the individual rotor parts, specifically those of the primary blade wheel acting as pump blade wheel has already exceeded a pre-established speed. The pre-established speed is preferably consistent with the speed at which the fill level condition recognition device begins to work correctly with high probability. When falling below this speed $n_2$ and a continued presence of a signal for attained maximum permissible filling degree, provided by the filling degree condition recognition device, verification will be continued until this speed $n_2$ is achieved and emptying of operating medium from the operating chamber of the hydrodynamic clutch is brought about. Otherwise, the filling process continues. The emptying process does not, however, take place completely, but only during a timing period $t_1$ of preferably 0 to 5 seconds. For this purpose, a device for influencing emptying from the hydrodynamic clutch is triggered. This device may take the form of a valve in the drain, or in the drainage line from the operating chamber of the hydrodynamic clutch. Allocation of the drainage line to the operating chamber via an interconnected coolant circuit is also possible.

After the emptying process, after a certain waiting period $t_2$, verification is made again as to whether the maximum filling degree in the hydrodynamic clutch has been reached. With the continued presence of a signal from the fill level recognition which indicates that the maximum filling degree has been reached, further measures are taken to enable emptying from the operating chamber. However, if a filling degree is determined which is below the defined maximum permissible filling degree, renewed filling will take place. Preferably, this will also be accomplished in a time period $t_3$ of 0 to 5 seconds. After a certain waiting period $t_4$, verification is made again as to whether an actuation of the fill level recognition is present, that is, whether a second increased pressure $p_2$ is established. Depending on the result, additional filling takes place or the filling is held constant.

Through the procedural steps for adjustment of a defined filling degree of a hydrodynamic clutch illustrated in this signal flow chart, it becomes clear that sometimes merely a control system is not sufficient, but that a continuous monitoring in connection with the control methods for adjustment of a pre-established filling degree of the hydrodynamic clutch is necessary. Filling and emptying processes are conducted as long as the signal for the maximum permissible filling degree, which may also be pre-established, is given out.

Referring to the arrangements in FIGS. 7b through 7d, the device for influencing the supply volume to the operating chamber of the hydrodynamic clutch, that is the fill valve, is open until the pressure switch device for the current rotational direction actuates in order to achieve a pre-defined filling of the hydrodynamic clutch. One must wait for the rated operating point and, if necessary, refill. In addition, the drain valve may be cycled open until the pressure switch device drops off again. Another possibility exists in the cycling of the fill valve until the fill level recognition actuates again.

FIG. 8b illustrates the process for adjusting a predefined and, according to the position of the dynamic pressure pump, freely selectable filling degree in a clutch configuration with volumetric operating medium exchange. FIG. 8b1 is a functional schematic of a hydrodynamic clutch 1 illustrating the procedure for volumetric cooling. The hydrodynamic clutch 1 includes a primary blade wheel 2 and a secondary blade wheel 3. The primary blade wheel 2 acts as an impeller and the secondary blade wheel 3 acts as a turbine wheel. The primary blade wheel 2 and the secondary blade wheel 3 together form at least one torus-shaped operating chamber 4. During operation, the operating medium flows between the bladed sections of the primary and secondary blade wheels in operating chamber 4. This circulation is also referred to as an operating circuit. Since a portion of the flow energy is converted into heat due to the circulation, it is necessary to remove the operating medium during continuous operation from the operating circuit and to cool it. A circuit 91 is allocated to the operating chamber for this purpose, which serves the circulation of operating medium during continuous operation. A supply line 92 and a drain line 93 are always allocated to this circuit 91. The supply line 92 and the drain line 93 may be connected with the circuit either separately, or together. A control valve is provided for this purpose. A first control valve 94, which permits coupling between drain line 93 and circuit 91, as well as an additional control element 95, which serves connection or disconnection of supply line 92 to circuit 91, are provided. The first control element 94 is in the form of a 3/2-way valve, the second control element 95 is at least a 2/2-way valve. The operating medium, circulating in circuit 91 during continuous operation, is operating medium emerging from the operating chamber through openings in the blade wheels into the interior of the clutch housing, or operating medium emerging with the blade wheels with rotating rotor.

A device for measuring the temperature in circuit 91 is provided in the drain line 96 from the operating chamber 4 of the hydrodynamic clutch. Depending on the measured temperature value which should not exceed a pre-established set value, a decision will be made whether operating medium from circuit 91 is to be exchanged with operating medium having a lower temperature. When exceeding the permissible temperature in drain line 96, the first control element 94, that is the 3/2-way valve, is activated so that it adopts a first operating position I in which the outlet line 96 is coupled with drain line 93.

This serves to remove the operating medium, which otherwise would circulate in circuit 91 for cooling purposes, at least partially from circuit 91 and from the operating circuit. This operating medium must be replaced by new operating medium. For this purpose, the 2/2-way valve 95 is moved into a first operating position in which the supply line 92 is coupled with circuit 91. Depending on the operating fluid that is removed from circuit 91, or the operating circuit in operating chamber 4, it is necessary to feed new operating medium into circuit 91. This infeed is accomplished through the 2-way valve 95.

The first control device 94 includes an additional operating position II. In the second operating position II, the operating medium that emerged from the work chamber in circuit 91, which is then operating as a closed loop, is again returned into the operating chamber 4.

Reference can be made to the operating procedure described in the signal flow chart in FIG. 8a for defined filling of the clutch. When an increased temperature T is measured after response of the temperature monitoring device, the emptying valve is opened, according to signal flow chart 8b1, and after a certain time period $t_5$ the valve in the infeed to the operating chamber of the hydrodynamic clutch is also opened. Monitoring of the temperature T continues. If it is lower than a permissible temperature $T_{perm.}$, adjustment of the filling degree may be made in accordance with the procedure as described in FIG. 8a. Interface is 1. If the range of permissible temperature $T_{perm.}$ is not reached, and at the same time a response of the fill level recognition unit detected, the fill valve will close and the emptying procedure will continue.

Figure 9:
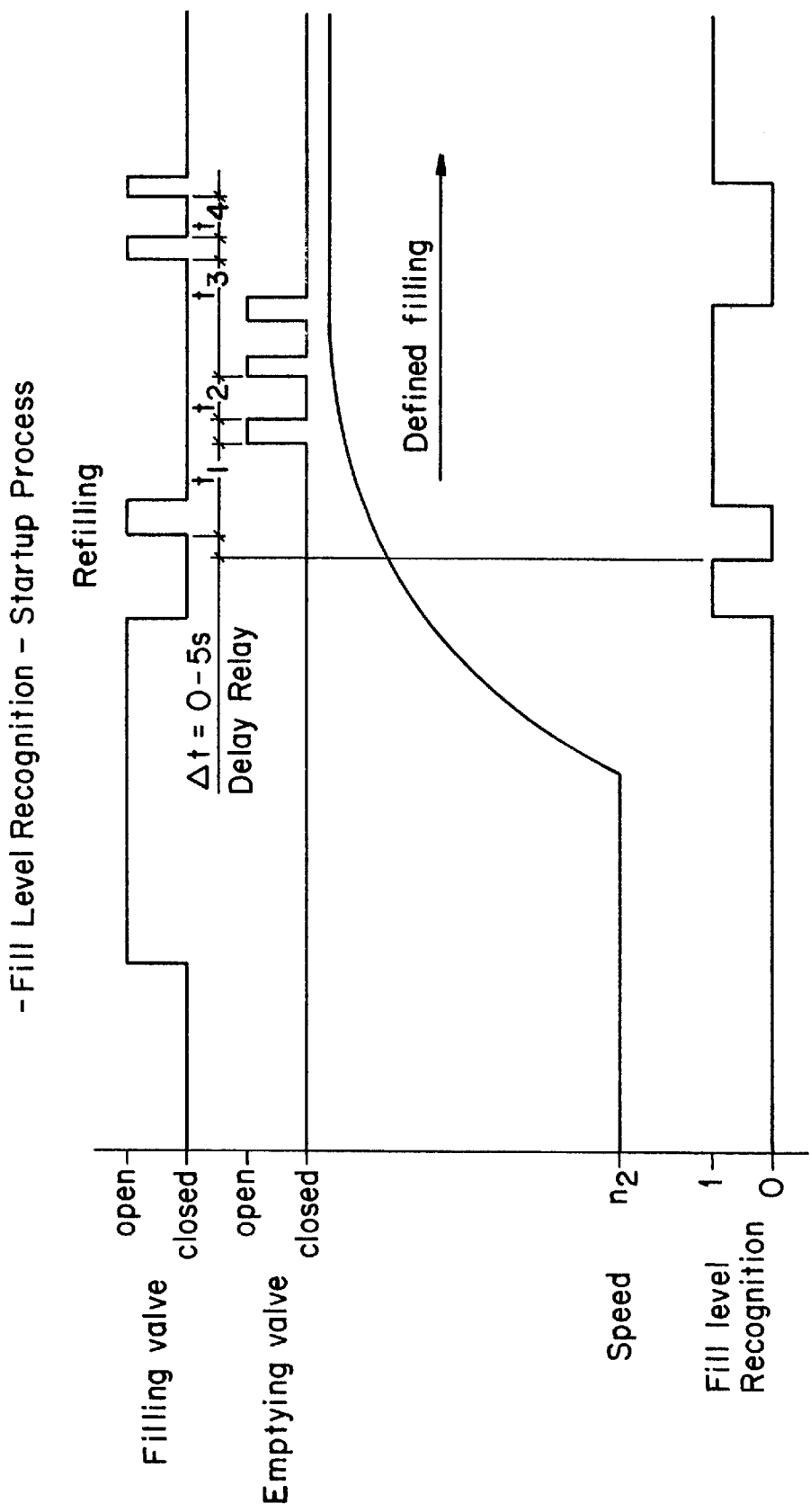

In the diagram for the start up procedure in FIG. 9, the operational modes of the device for influencing the operating medium in the operating chamber of the hydrodynamic clutch, of the emptying valve, the drive motor speed and the fill level recognition are entered over the time. The relationships correspond with those described in the signal flow chart in FIG. 8a. From this diagram, it is clearly visible that the device for influencing the supply volume to the operating chamber of the hydrodynamic clutch, that is, the filling valve, is open until the fill level recognition displays a second, increased pressure value. Since the fill level recognition is a so-called black-white control, the assumption may be made that only two conditions, 0 and 1, are considered. It is further clear that when the second pressure value has been reached at the dynamic pressure generator, the fill valve will be closed. While the fill level recognitions in further operation indicates a condition which corresponds only to a partial filling, the fill valve is influenced so that a refill process occurs in the operating chamber. After completion of the refill process, that is, when the fill valve has already closed again, the fill level recognition continues to indicate the maximum permissible filling degree. This diagram further indicates that the drain from the operating chamber of the hydrodynamic clutch, specifically the emptying valve, is also included in the strategy for defined filling degree adjustment. Consequently, a targeted occasional opening of the emptying valves in the drain of the operating chamber of the hydrodynamic clutch occurs during a time period in which the fill level recognition continuously indicates a filling degree which is consistent with the maximum permissible filling degree.

Selection of the valves necessary to meet the functional requirements is made on a case by case basis. Preferably however, selector valves are utilized. These may also be infinitely operable.

Continuous or step by step adjustment of the dynamic pressure pump position may take various forms. The actual arrangement is at the discretion of the expert and will be consistent with the requirements of individual applications. The same applies to additional functions, such as delayed response to a pressure signal from the dynamic pressure generator, priority status of the fill level signal over a signal for a desired fill volume.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of overfill protecting a hydrodynamic clutch, said method comprising the steps of:

providing at least two blade wheels, said blade wheels forming at least one torus-shaped operating chamber, said at least one torus-shaped operating chamber being configured for being filled with operating medium;

determining a filling degree of the clutch by using a value that at least indirectly characterizes said filling degree;

interrupting a supply of the operating medium to said operating chamber when a maximum filling degree is attained;

coupling an accumulation chamber with said operating chamber;

feeding the operating medium from said operating chamber into said accumulation chamber in a substantially proportional ratio to said filling degree of the clutch;

inserting at least one of a dynamic pressure generator and sensor into said accumulation chamber;

arranging said at least one of a dynamic pressure generator and sensor relative to said accumulation chamber such that:

in a first filling condition in which said filling degree of the clutch is lower than said maximum filling degree, one of no pressure and a substantially constant first pressure is measured by said at least one of a dynamic pressure generator and sensor; and in a second filling condition corresponding to said maximum filling degree, a second pressure is measured by said at least one of a dynamic pressure generator and sensor, said second pressure being substantially greater than said first pressure;

providing a device for influencing said supply of operating medium to said operating chamber;

at least indirectly triggering said device using said second pressure; and generating at least one signal pressure spike in a transition from one of said first filling condition and said second filling condition to another of said first filling condition and said second filling condition.

2. The method of claim 1, wherein said at least one of a dynamic pressure generator and sensor comprises at least one dynamic pressure tube having an opening area extending into said accumulation chamber.

3. The method of claim 2, wherein said second pressure comprises a dynamic pressure in said dynamic pressure tube, said method comprising, in said filling degree condition, the further step of accepting operating medium into said accumulation chamber through said opening area of said dynamic pressure tube.

4. The method of claim 3, comprising the further step of providing a control device having an input signal, said input signal being at least indirectly related to said second pressure.

5. The method of claim 4, wherein said maximum filling degree comprises a theoretical maximum permissible filling degree of 100%.

6. The method of claim 1, comprising the further step of adjusting a position of said at least one of a dynamic pressure generator and sensor to thereby freely adjust said maximum filling degree relative to said accumulation chamber.

7. The method of claim 6, wherein said step of interrupting a supply of the operating medium to said operating chamber occurs after a time delay for measuring said second pressure.

8. The method of claim 1, comprising the further step of releasing said supply of the operating medium after said step of interrupting a supply of the operating medium while measuring a first pressure value.

9. The method of claim 8, comprising the further steps of:
sensing said second pressure after said releasing step;
determining one of a drive motor speed and a value at least indirectly characterizing a drive motor speed; and
comparing said one of a drive motor speed and a value at least indirectly characterizing a drive motor speed with a pre-established value, said pre-established value forming a starting point from which said step of determining a filling degree can be performed trouble free.

10. The method of claim 9, comprising the further steps of:
continuing said feeding step when said pre-established value is above said one of a drive motor speed and a value at least indirectly characterizing a drive motor speed, and said first pressure is measured; and
continuing said feeding step until said pre-established value is approximately equal to said one of a drive motor speed and a value at least indirectly characterizing a drive motor speed when said second pressure is measured.

11. The method of claim 10, comprising the further steps of:
periodically emptying the hydrodynamic clutch after:
said pre-established value has reached a value approximately equal to said one of a drive motor speed and a value at least indirectly characterizing a drive motor speed; and
said second pressure has been measured; and
repeating said feeding step, said repeating of said feeding step continuing over a pre-established period of time when said first pressure is present.

12. The method of claim 11, comprising the further step of verifying the presence of one of a first pressure and a second pressure after expiration of a waiting period.

13. The method of claim 1, comprising the further step of allocating at least one cooling circuit to said operating chamber.

14. The method of claim 13, comprising the further step of determining a current temperature, said determining step being performed in said at least one cooling circuit.

15. The method of claim 14, comprising the further step of draining operating medium from said at least one cooling circuit for a certain period of time after said current temperature exceeds a maximum permissible temperature.

16. The method of claim 15, comprising the further step of feeding operating medium into said at least one cooling circuit at least one of during and after said certain period of time.

17. The method of claim 16, comprising the further steps of:
determining a temperature in said cooling circuit after an operating medium exchange;
comparing said temperature in said cooling circuit to a second permissible temperature value for an operating condition following said operating medium exchange; and
if said temperature in said cooling circuit substantially deviates from said second permissible temperature value, and said second pressure occurs, then:
interrupting said step of feeding operating medium into said at least one cooling circuit; and
again draining operating medium from said at least one cooling circuit.

18. A hydrodynamic clutch, comprising:
at least two blade wheels, said at least two blade wheels including a primary blade wheel and a secondary blade wheel, said primary blade wheel and said secondary blade wheel defining at least one torus-shaped operating chamber configured for being filled with operating medium;
at least one supply line configured for carrying operating medium, said at least one supply line being associated with said at least one torus-shaped operating chamber;
a first device configured for influencing an operating medium supply volume into said at least one operating chamber;
a second device configured for capturing a value at least indirectly characterizing a filling degree, said second device being at least indirectly coupled with said first device, said second device being associated with said at least one operating chamber, said second device including:
an accumulation chamber coupled with said at least one operating chamber; and
one of a dynamic pressure generator and sensor, said one of a dynamic pressure generator and sensor extending into said accumulation chamber such that only after a determined operating medium level which is substantially equal to an established maximum filling degree has been reached in said accumulation chamber, does said one of a dynamic pressure generator and sensor accept operating medium and a thereby captured dynamic pressure is used to at least one of:
at least indirectly trigger said first device to reduce the operating medium supply volume; and
disconnect said at least one supply line from said at least one operating chamber; and
a blade wheel associated with said accumulation chamber.

19. The hydrodynamic clutch of claim 18, further comprising a catch trough associated with at least one of said blade wheels, said catch trough at least partly defining said accumulation chamber.

20. The hydrodynamic clutch of claim 19, wherein said catch trough includes at least one separate component, said at least one separate component being disconnectably coupled with at least one said blade wheel.

21. The hydrodynamic clutch of claim 19, wherein said blade wheel at least partly defines said catch trough.

22. The hydrodynamic clutch of claim 18, wherein said one of a dynamic pressure generator and sensor has a position, said position being adjustable relative to said accumulation chamber.

23. The hydrodynamic clutch of claim 18, wherein said one of a dynamic pressure generator and sensor comprises at least one dynamic pressure tube.

24. The hydrodynamic clutch of claim 23, wherein said at least one dynamic pressure tube includes at least one component having an opening, said opening being configured for intaking operating medium.

25. The hydrodynamic clutch of claim 24, further comprising:
a clutch axis having at least one radial direction; and
a pipe component connected to said at least one component having an opening, said pipe component being disposed above said clutch axis in a selected said radial direction.

26. The hydrodynamic clutch of claim 25, wherein said at least one component having an opening is configured for being oriented substantially parallel to an operating medium level in said accumulation chamber.

27. The hydrodynamic clutch of claim 26, wherein said at least one component having an opening is substantially parallel to said at least two blade wheels.

28. The hydrodynamic clutch of claim 27, wherein said at least one component having an opening comprises said pipe component, said pipe component being disposed above said clutch axis in a selected said radial direction.

29. The hydrodynamic clutch of claim 26, wherein said at least one component having an opening extends in a circumferential direction.

30. The hydrodynamic clutch of claim 29, wherein said at least one dynamic pressure tube comprises two dynamic pressure tubes, each said dynamic pressure tube having a respective said opening, said openings facing in opposite circumferential directions, said openings being configured for reverse operation.

31. The hydrodynamic clutch of claim 30, further comprising:
a common line; and
a valve unit configured for connecting said dynamic pressure tubes with said common line.

32. The hydrodynamic clutch of claim 29, wherein said at least one dynamic pressure tube includes two said openings, said openings facing in opposite circumferential directions, said openings being configured for reverse operation.

33. The hydrodynamic clutch of claim 32, wherein said at least two blade wheels include at least one clearance opening, said operating chamber being coupled to said accumulation chamber through said at least one clearance opening.

34. The hydrodynamic clutch of claim 33, wherein said at least two blade wheels include a bladed area, said at least one clearance opening being oriented in a selected said radial direction in said bladed area.

35. The hydrodynamic clutch of claim 33, wherein said at least two blade wheels include a blade-free area, said at least one clearance opening being oriented in a selected said radial direction in said blade-free area.

36. The hydrodynamic clutch of claim 18, wherein said at least one torus-shaped operating chamber comprises one operating chamber.

37. The hydrodynamic clutch of claim 36, wherein said primary blade wheel and said secondary blade wheel define at least one additional operating chamber.

38. The hydrodynamic clutch of claim 36, wherein said accumulation chamber is associated with said primary blade wheel.

39. The hydrodynamic clutch of claim 36, wherein said accumulation chamber is associated with said secondary blade wheel.

40. The hydrodynamic clutch of claim 39, wherein said at least two blade wheels include an outer diameter, said accumulation chamber having a diameter less than said outer diameter of said at least two blade wheels.

41. The hydrodynamic clutch of claim 40, further comprising:
an actuator associated with said first device; and
a third device configured for converting pressure generated by said one of a dynamic pressure generator and sensor into an electric actuating signal for triggering said actuator, said third device being associated with said one of a dynamic pressure generator and sensor.

42. The hydrodynamic clutch of claim 41, wherein said third device comprises at least one pressure switch.

43. The hydrodynamic clutch of claim 42, further comprising a plurality of time delay relays associated with said at least one pressure switch.

44. The hydrodynamic clutch of claim 43, wherein said first device comprises a valve device.

45. The hydrodynamic clutch of claim 44, further comprising a control unit having a first input and an output, said first input being at least indirectly coupled with said one of a dynamic pressure generator and sensor, said output being coupled with said first device.

46. The hydrodynamic clutch of claim 45, wherein said control unit has a second input, said hydrodynamic clutch further comprising:
a fourth device configured for providing a filling signal, said fourth device being coupled with said second input; and
a fifth device configured for providing a controller output for at least indirect triggering of said first device, said fifth device being dependent upon said first input and said second input.

47. The hydrodynamic clutch of claim 18, further comprising an operating medium supply system including at least one enclosed circuit configured for serving operating medium circulation during operation.

48. The hydrodynamic clutch of claim 47, further comprising:
a supply line configured for being connected to said at least one enclosed circuit;
a drain line configured for being connected to said at least one enclosed circuit;
a first control valve having a first control device; and
at least one sixth device configured for:
at least indirectly establishing an operating medium temperature; and
being coupled with said first control device of said first control valve for connection of said at least one enclosed circuit with said drain line.

49. The hydrodynamic clutch of claim 48, further comprising:
a seventh device configured for determining pressure in said at least one enclosed circuit; and a second valve having a second control device, said second control device being coupled with said seventh device for connection of said supply line.

50. The hydrodynamic clutch of claim 49, wherein said first control valve has at least a first operating position and a second operating position, said at least one enclosed circuit being coupled with said drain line in said first operating position, said at least one enclosed circuit being configured to allow the operating medium to circulate therein in said second operating position.

51. The hydrodynamic clutch of claim 50, wherein said second valve has at least a first operating position and a second operating position, said at least one enclosed circuit being connected with said supply line in said first operating position, said at least one enclosed circuit being disconnected from said supply line in said second operating position.

52. The hydrodynamic clutch of claim 51, wherein at least one of said first control valve and said second control valve comprises a 3/2-way valve.

53. The hydrodynamic clutch of claim 51, wherein at least one of said first control valve and said second control valve comprises a 2/2-way valve.

* * * * *

UNITED STATES PATENT AND TRADEMARK OFFICE
CERTIFICATE OF CORRECTION

PATENT NO.    : 6,357,229 B1
DATED         : March 19, 2002
INVENTOR(S)   : Schust et al.

It is certified that error appears in the above-identified patent and that said Letters Patent is hereby corrected as shown below:

<u>Title page,</u>
Item [56], FOREIGN PATENT DOCUMENTS, insert
-- FR   1   236   353   A   6/7/60...............F06d -- and insert
-- GB   896   195   5/1962...........F06d --.

<u>Column 3,</u>
Line 42, delete "refined" and substitute -- defined -- therefor.

<u>Column 8,</u>
Line 57, delete "re-established" and substitute -- pre-established -- therefor.

<u>Column 12,</u>
Line 9, delete "of on-off" and substitute -- of an on-off -- therefor;
Line 29, delete "II21" and substitute -- $II_{21}$ -- therefor; and
Line 35, delete "device" and substitute -- device 23 -- therefore.

<u>Column 14,</u>
Line 59, delete "discord" and substitute -- discoid -- therefor.

<u>Column 21,</u>
Line 13, delete "It" and substitute -- If -- therefor.

Signed and Sealed this

Eighth Day of July, 2003

JAMES E. ROGAN
*Director of the United States Patent and Trademark Office*